US008168695B2

(12) United States Patent
Yokoi et al.

(10) Patent No.: US 8,168,695 B2
(45) Date of Patent: May 1, 2012

(54) INK COMPOSITION, INKJET RECORDING METHOD, AND PRINTED MATERIAL

(75) Inventors: Kazuhiro Yokoi, Kanagawa (JP); Yuuichi Hayata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 533 days.

(21) Appl. No.: 12/320,722

(22) Filed: Feb. 3, 2009

(65) Prior Publication Data

US 2009/0197056 A1    Aug. 6, 2009

(30) Foreign Application Priority Data

Feb. 6, 2008   (JP) ................. 2008-026106
Jan. 28, 2009  (JP) ................. 2009-016634

(51) Int. Cl.
   *C09D 11/10*   (2006.01)
(52) U.S. Cl. ........ 523/160; 524/544; 524/555; 524/560; 524/588; 428/195.1; 427/466
(58) Field of Classification Search .......... 524/544, 524/555, 560; 526/242, 258, 263, 307.1, 526/310, 279, 348.2, 337
   See application file for complete search history.

(56) References Cited

U.S. PATENT DOCUMENTS

| 2004/0099170 A1 | 5/2004 | Takabayashi |
| 2005/0137283 A1 | 6/2005 | Frese et al. |

FOREIGN PATENT DOCUMENTS

| EP | 1616922 A | 1/2006 |
| EP | 1717282 A | 11/2006 |
| JP | A 9-183928 | 7/1997 |
| JP | 10-158565 A | 6/1998 |
| JP | A 2003-312121 | 11/2003 |
| JP | A 2003-341217 | 12/2003 |
| JP | A 2004-91558 | 3/2004 |
| JP | 2006-056958 A | 3/2006 |
| WO | 99/29787 A | 6/1999 |
| WO | 99/29788 A | 6/1999 |
| WO | 00/20517 A | 4/2000 |
| WO | 03/010249 A | 2/2003 |
| WO | 2007/045580 A | 4/2007 |

OTHER PUBLICATIONS

Corresponding Extended European Search Report.
Corresponding European Search Report.

*Primary Examiner* — David W Wu
*Assistant Examiner* — Vu A Nguyen
(74) *Attorney, Agent, or Firm* — Solaris Intellectual Property Group, PLLC

(57) ABSTRACT

This invention provides an ink composition capable of forming an image which has favorable curing sensitivity, is excellent in rubbing resistance and blocking properties, and has controlled surface stickiness and improved surface curing properties, an inkjet recording method using the ink composition, and a printed material; and the ink composition containing a polymer (a) including a partial structure selected from the group consisting of fluorine-substituted hydrocarbon group, a siloxane skeleton group, and a long-chain alkyl group; a radical polymerizable group, and a tertiary amine structure.

9 Claims, No Drawings

INK COMPOSITION, INKJET RECORDING METHOD, AND PRINTED MATERIAL

CROSS-REFERENCE TO RELATED APPLICATION

This application claims priority under 35 USC 119 from Japanese Patent Application Nos. 2008-026106 and 2009-016634, the disclosures of which are incorporated by reference herein.

BACKGROUND OF THE INVENTION

1. Field of the Invention

The present invention relates to an ink composition favorably used for inkjet recording, an inkjet recording method, and a printed material produced therewith.

2. Description of the Related Art

There are many image-recording methods of forming an image on a recording medium such as paper based on image data signals, including those in an electrophotographic process, a sublimation or fusion heat-transfer process, and an inkjet process. Among them, the inkjet process is advantageous in that it allows printing in an inexpensive device, and because it forms an image directly on a recording medium by ejecting ink only in a required image region, ink can be used more efficiently, and running costs are low. In addition, the inkjet process is also less noisy and thus advantageous as an image-recording method. The inkjet process allows printing not only on plain paper but also on non-water absorbing recording media such as a plastic sheet or metal plate, but it is imperatively required to increase the printing speed and improve the image quality. The time required for drying and curing the ink droplets after printing significantly influences the efficiency in producing printed materials and sharpness of the printed image.

Among the inkjet recoding processes, there is a recording method by using an inkjet recording ink that can be cured by irradiation with a radiation ray. In the method, it is possible to improve the printing efficiency and form a sharp image, by curing the ink droplet by irradiating it with a radiation ray immediately or after a particular period from ink ejection. By increasing the sensitivity of the inkjet recording ink which is curable by irradiation with a radiation ray such as an ultraviolet ray, the ink has higher curability with respect to radiation rays, which brings about many benefits such as improvement in inkjet recording efficiency, reduction in power consumption, prolongation of the lifetime of a radiation ray generator owing to the decrease in the load, and prevention of volatilization of low-molecular substances caused by insufficient curing. Further, the increase in the sensitivity particularly increases the strength of the image formed using the inkjet recording ink. In particular, a planographic printing plate produced using the ink has increased strength in the image portion thereof, and thus provides higher printing durability.

In recent years, such an inkjet recording process using an inkjet recording ink that cures by irradiation with a radiation ray, such as an ultraviolet ray, has been increasingly drawing attention due to relatively low odor, quick-drying properties, and the ability to record on a target recording medium having no ink absorption properties, and a cationic polymerization ink composition having excellent adhesiveness to a target recording medium and low shrinkage at the time of ultraviolet curing has been proposed (e.g., Japanese Patent Application Laid-Open (JP-A) No. 9-183928). However, the cationic polymerization inks have insufficient stability during storage due to a reaction caused by acid generated with time, which has become a serious hindrance in practical utilization thereof. Therefore, a technique of adding a basic compound or a thermal base generator has been proposed as an attempt to improve storage stability (e.g., Japanese Patent Application Laid-Open (JP-A) Nos. 2003-312121, 2003-341217, and 2004-91558). However, it has been revealed that there arises another problem in that a basic compound impairs functions of acid generated by light exposure, which decreases the curing sensitivity of the ink.

SUMMARY OF THE INVENTION

The present invention aims to solve the above-described prior art problems, and achieve the following. More specifically, the invention according to an aspect of the invention provides an ink composition comprising a polymer (a) including: a partial structure selected from the group consisting of a fluorine-substituted hydrocarbon group, a siloxane skeleton, and a long-chain alkyl group; a radical polymerizable group; and a tertiary amine structure, which has favorable curing sensitivity, excellent rubbing resistance and blocking properties, and is capable of forming an image having controlled surface stickiness and increased surface curing properties; an inkjet recording method using the ink composition; and a printed material.

DETAILED DESCRIPTION

The inventors found, after studying hard the problems, that the objects to solve the problems may be achieved by items <1> to <10> shown below.

<1>. An ink composition comprising a polymer (a) including: a partial structure selected from the group consisting of a fluorine-substituted hydrocarbon group, a siloxane skeleton, and a long-chain alkyl group; a radical polymerizable group; and a tertiary amine structure.

<2>. The ink composition according to the item <1>, wherein the fluorine-substituted hydrocarbon group is introduced using a monomer represented by Formula II:

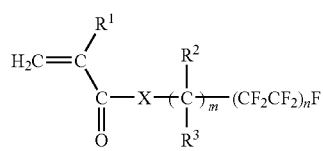

Formula (II)

wherein in Formula (II), $R^1$ represents a hydrogen atom, a halogen atom, a methyl group which may have a substituent group, or an ethyl group which may have a substituent group; $R^2$ and $R^3$ each independently represent a hydrogen atom or an alkyl group having 1 to 4 carbon atoms; X represents a covalent bond or a divalent connecting group (organic group); m represents an integer of 0 or more; and n represents an integer of 1 or more.

<3>. The ink composition according to the items <1> or <2>, wherein the siloxane skeleton is polysiloxane in which a compound represented by Formula (A) has been polymerized;

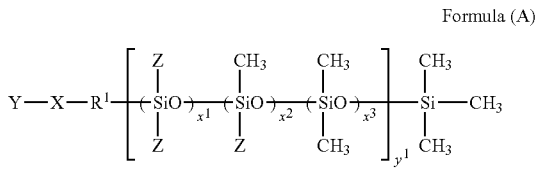

Formula (A)

wherein in Formula (A), $R^1$ represents a straight or branched alkylene group having 2 to 6 carbon atoms or a divalent connecting group represented by Formula (B); $x^1$, $x^2$, and $x^3$ each represent an integer in which the total of $x^1$, $x^2$, and $x^3$ is from 1 to 100; $y^1$ represents an integer of from 1 to 10; X represents a single bond or a divalent group represented by Formula (C); Y represents a monovalent group represented by Formulae (D) to (F); and Z represents a monovalent group represented by the following structure;

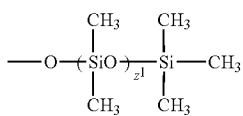

wherein in the above structure, $z^1$ represents an integer of from 3 to 100;

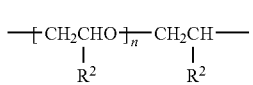

Formula (B)

wherein in Formula (B), $R^2$ represents a hydrogen atom or a methyl group, and n represents an integer of from 1 to 50;

$$-Z^1-CO-NH-R^3-NH-CO-$$ Formula (C)

wherein in Formula (C), $Z^1$ represents an oxygen atom, a sulfur atom, or $NR^4$; $R^4$ represents a hydrogen atom or an alkyl group having 1 to 4 carbon atoms; is bonded to $R^1$ in Formula (A); and $R^3$ represents a divalent aliphatic or alicyclic group having 6 to 10 carbon atoms;

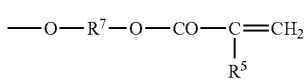

Formula (D)

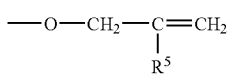

Formula (E)

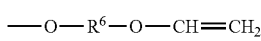

Formula (F)

wherein in Formulae (D) to (F), $R^5$ represents a hydrogen atom or a straight chain or branched chain alkyl group having 1 to 6 carbon atoms, $R^6$ represents a straight chain or branched chain alkylene group having 2 to 10 carbon atoms, and $R^7$ represents a straight chain or branched chain alkylene group having 1 to 6 carbon atoms.

<4>. The ink composition according to any one of the items <1> to <3>, wherein the long-chain alkyl group is a substituent group represented by $-C_nH_{2n+1}$ in Formula (1), and is introduced into a polymer in the form represented by Formula (1):

Formula (1)

wherein in Formula (1), n represents an integer of from 6 to 40, and Y represents a trivalent connecting group.

<5>. The ink composition according to any one of the items <1> to <4>, wherein the tertiary amine structure is the following structure,

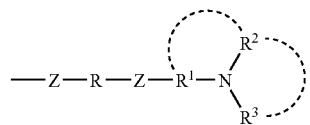

wherein in the above structure, R and $R^1$ represent a straight chain, branched, or cyclic alkylene group having 1 to 6 carbon atoms; Z represents an oxygen atom, $-C(=O)O-$, $-OC(=O)NH-$, or $-NHC(=O)NH-$; $R^2$ and $R^3$ represent a straight chain, branched, or cyclic alkyl group having 1 to 6 carbon atoms; $R^1$ and $R^2$, or $R^2$ and $R^3$ may be mutually bonded to each other to form a ring having 5 to 7 carbon atoms; and the ring may have a substituent group.

<6>. The ink composition according to any one of the items <1> to <5>, further comprising a radical polymerizable compound (b) and a photoinitiator (c).

<7>. The ink composition according to the item <6>, wherein a content of the radical polymerizable compound (b) is from 60% by mass to 90% by mass based on the total solid content of the ink composition.

<8>. A use for inkjet recording of the ink composition according to any one of the items <1> to <7>.

<9>. An inkjet recording method comprising:
ejecting on a recordable medium the ink composition of any one of the items <1> to <8> using an inkjet recording apparatus; and
curing the ink composition by irradiation of an actinic radiation ray to the ejected ink composition.

<10>. A printed material which is recorded by the inkjet recording method of the item <9>.

A mechanism of action in the present invention is not clear, but it is imagined as follows.

The ink composition of the present invention contains a polymer including a partial structure selected from the group consisting of a fluorine-substituted hydrocarbon group, a siloxane skeleton, and a long-chain alkyl group, a radical polymerizable group, and a tertiary amine structure. The polymer has low surface energy. Thus, it is considered that the use of an ink composition of the present invention whose surface has been coated with the polymer allows formation of an image excellent in rubbing resistance and blocking properties. This is because the partial structure selected from a fluorine-substituted hydrocarbon group, a siloxane skeleton, and a long-chain alkyl group acts as a surface orientation group, and thus they are segregated on the surface of a composition. Further, since the polymer has a polymerizable group, the density of the polymerizable group on the surface of an ink composition can be increased. Moreover, it is considered that, since the ink composition further has a tertiary amine structure which contributes to stability, the ink composition is imparted with effects of curing a film surface, suppressing surface stickiness, and giving excellent blocking properties during storage. Furthermore, the inside of a film after surface curing has moderate flexibility.

<Ink Composition>

The ink composition of the present invention contains a polymer including a partial structure selected from the group consisting of a fluorine-substituted hydrocarbon group i-1), a siloxane skeleton i-2), and a long-chain alkyl group i-3) (hereinafter sometimes referred to as specific portions i-1), i-2), and i-3), respectively), a radical polymerizable group (ii), and a tertiary amine structure (iii) (hereinafter sometimes referred to as a specific polymer (a)).

The ink composition of the present invention is an ink composition which can be cured by irradiation with radiation ray. In the present invention, the "radiation ray" as used herein is not limited insofar as energy capable of generating an initiation species in the composition by irradiation with radiation ray can be given, and includes various rays, such as α-rays, γ-rays, X-rays, ultraviolet rays, visible rays, and electron beams. Among the above, from the viewpoint of curing sensitivity and ease of availability of a device, ultraviolet rays and electron beams are preferable, with ultraviolet rays being particularly preferable. Therefore, it is preferable that the ink composition of the present invention can be cured by irradiating ultraviolet rays as a radiation ray. It should be noted that since the ink composition of the present invention contains the above-mentioned specific polymer, the ink composition of the present invention has high sensitivity and can be sufficiently cured by using, as an exposure light source, a light source with a low light exposure amount, such as a light emitting diode. Thus, the effects of the present invention are possibly remarkably exhibited when the ink composition of the present invention is applied as described above.

Moreover, it is preferable for the ink composition of the present invention to contain a colorant because the ink composition of the present invention is cured with the above-mentioned radiation ray to form an image.

Hereinafter, each component contained in the ink composition of the present invention will be described in detail.

First, a specific polymer (a) which is a characteristic component of the present invention will be described.

The specific polymer (a) of the present invention contains a partial structure selected from the group consisting of a fluorine-substituted hydrocarbon group i-1), a siloxane skeleton i-2), and a long-chain alkyl group i-3).

<i-1) Fluorine-Substituted Hydrocarbon Group>

The fluorine-substituted hydrocarbon group as a specific site in the specific polymer contained in the ink composition of the present invention may be a hydrocarbon group containing at least one fluorine in the molecule. Examples thereof include a fluoroalkyl group or a fluoroalkylene group in which at least one hydrogen atom in the alkyl group or the alkylene group has been substituted by a fluorine atom. A perfluoroalkyl group or a perfluoro alkylene group in which all the hydrogen atoms of the alkyl group or the alkylene group have been substituted by fluorine atoms is more preferable, and such a perfluoroalkyl group is still more preferable.

As an alkyl group, the number of carbon atoms is preferably from 3 to 12, more preferably from 4 to 10, and still more preferably from 6 to 8.

As an alkylene group, the number of carbon atoms is preferably from 2 to 12, more preferably from 4 to 10, and still more preferably from 6 to 8.

Specific aspects of the fluorine-substituted hydrocarbon group in the present invention will be described.

Examples of a preferable fluorine-substituted hydrocarbon group contained in the specific polymer (a) include substances described under (A) or (B).

(A) Substituent group (hereinafter also referred to as a fluoroaliphatic group) derived from a fluoroaliphatic compound produced by a telomerization method or an oligomerization method.

(B) Substituent group having a structure represented by Formula (I).

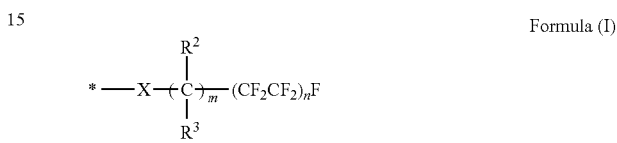

Formula (I)

In Formula (I), $R^2$ and $R^3$ each independently represent a hydrogen atom or an alkyl group having from 1 to 4 carbon atoms, X represents a covalent bond or a bivalent linking group (organic group), m represents an integer of 0 or more, and n represents an integer of 1 or more. In addition, when m is 2 or more, the functional groups on the carbon atoms adjacent to one another (namely, $R^2$'s or $R^3$'s bonding to carbon atoms adjacent to each other) may link together to form an aliphatic ring. The substituent represented by Formula (I) is connected to the polymer main chain at the part of mark *.

(A) A Substitution Group Derived from a Fluoroaliphatic Compound Produced by a Telomerization Method or an Oligomerization Method.

The substitution group i-1) in the invention is preferably a group derived from a fluoroaliphatic compound produced by a telomerization method, occasionally referred to as telomer method, or an oligomerization method, occasionally referred to as oligomer method. Methods for the preparation of such fluoroaliphatic compounds are disclosed in, for instance, "Fussokagoubutsu no Gosei to Kinou (Synthesis and Functions of Fluorine Compounds)", edited by ISHKAWA Nobuo, published by CMC Company, 1987, pp. 117-118; and "Chemistry of Organic Fluorine Compounds II" (Monograph 187, Edited by Milos Hudlicky and Attila E. Paviath, American Chemical Society, 1995, pp. 747-752.

The telomerization method is a method for the synthesis of a telomer by subjecting a fluorine-containing vinyl compound such as tetrafluoroethylene to radical polymerization using an alkyl halide having a high chain transfer coefficient such as an iodide as a telogen. Synthesis Example 1 shown below is one specific example.

Synthesis Example 1

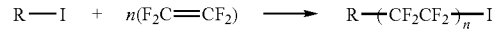

The resulting fluorine-terminated telomers are usually terminal-modified properly as shown in Synthesis Example 2 below, to give fluoroaliphatic compounds. These compounds are, if necessary, transferred to a desired monomer structure, and then used for preparation of fluoroaliphatic group-containing polymers.

Synthesis Example 2

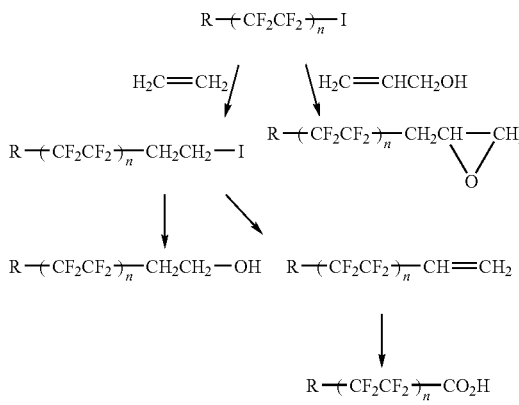

As a monomer produced by the telomer method, monomers represented by the following Formula [TM-1] are preferred. The monomer may be introduced to produce the specific polymer of the present invention.

[TM-1]

In Formula [TM-1], T represents one group selected from (T Group) given below, Z represents one group selected from (Z Group) given below, and n denotes an integer of from 0 to 20. The monomer represented by the Formula [TM-1] may be introduced to produce the specific polymer of the present invention by copolymerization of the double bonding group in Z Group of the monomer or reacting the reactive group other than the double bonding group in Z Group of the monomer with the reactive group of the polymer.

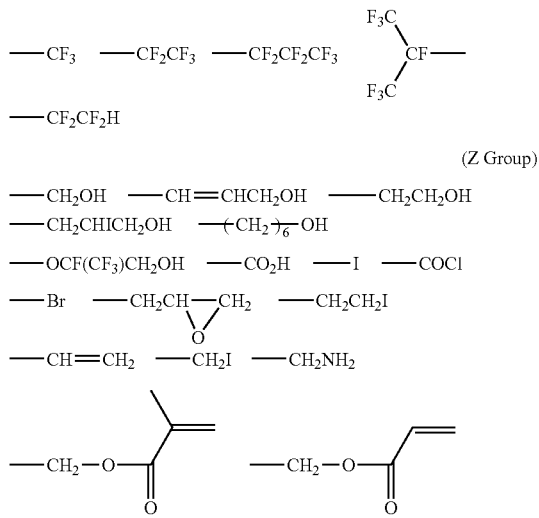

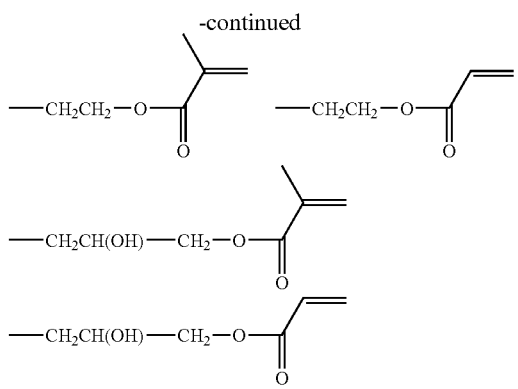

Compounds in which the group represented by Z in Formula [TM-1] is one group selected from the (Z' Group) are particularly preferred because they have an acryloyl group or methacryloyl group on the terminal of the molecule and therefore it is possible to easily obtain polymers having aforementioned groups derived from fluoroaliphatic compounds (namely, fluorine-containing polymers in the invention) by vinyl polymerization.

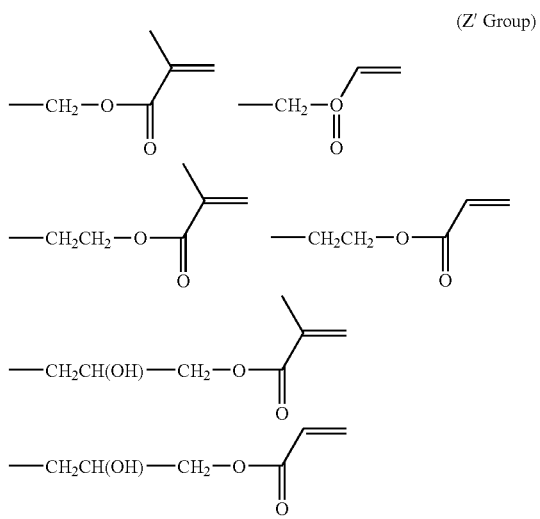

Specific examples of compounds produced by the above-mentioned telomer method suitable as a compound to be introduced into a side chain of a specific polymer in the invention, (in other words, examples of compounds including monomers represented by the formula [TM-1] as a major component) include the compounds shown below.

Examples include fluorine-containing chemicals available from Daikin Chemicals Sales Co., Ltd. such as A-1110, A-1210, A-1310, A-1420, A-1620, A-1820, A-2020, A-1260, A-1460, A-1660, A-1860, A-1435, A-1635, A-1835, A-1473, A-1637, A-1837, A-1514, A-3420, A-3620, A-3820, A-4020, A-3260, A-3460, A-3660, A-3860, A-3637, A-3837, A-5210, A-5410, A-5610, A-5810, A-7110, A-7210, A-7310, A-9211, C-1100, C-1200, C-1300, C-1400, C-1500, C-1600, C-1700, C-1800, C-1900, C-2000, C-5200, C-5400, C-5600, C-5800, C-5208, C-5408, C-5608, C-6008, C-8200, C-8300, C-8500, C-9211, C-8208, C-8308, C-8508, C-9216, E-1430, E-1630, E-1830, E-2030, E-3430, E-3630, E-3830, E-4030, E-5244, E-5444, E-5644, E-5844, F-1420, F-1620, F-1820, F-2020, I-1200, I-1300, I-1400, I-1600, I-1700, I-1800, I-2000, I-1420, I-1620, I-1820, I-2020, I-3200, I-3400, I-3600, I-3800, I-4000, I-3620, I-3820, I-4020, I-5200, I-5400, I-5600, I-8208, I-8207, I-8407, I-8607, M-1110, M-1210, M-1420, M-1620, M-1820, M-2020, M-3420, M-3620, M-3820, M-4020, M-3433, M-3633, M-3833, M-4033, M-5210, M-5410, M-5610, M-5810, M-6010, M-7210, M-7310, R-1110, R-1210, R-1420, R-1620, R-1820, R-2020, R-1433, R-1633, R-1833, R-3420, R-3620, R-3820, R-4020, R-3433, R-5210, R-5410, R-5610, R-5810, 6010, R-7210, R-7310, U-1310, U-1710, and CHEMINOX FA, FA-M, FAAC, FAAC-M, FAMAC, FAMAC-M, which are produced by Nippon Mektron, Ltd.

Compounds produced by the aforementioned telomer method may easily be converted into polymers having, on side chains thereof, fluoroaliphatic groups according to a method known to one of ordinary skill in the art.

In the invention, fluoroaliphatic compounds produced by the oligomerization method (oligomer method) are also preferred. The oligomerization method is a method for the preparation of an oligomer by cationic polymerization of tetrafluoroethylene using potassium fluoride or cesium fluoride as a catalyst in a polar solvent such as diglyme. Synthesis Example 3 shown below is one specific example. A fluoroaliphatic compound obtained by the oligomer method may be converted into a polymer having, on side chains thereof, groups derived from fluoroaliphatic groups (namely, fluorine-containing polymer in the invention), through appropriate chemical modification by making use of reactive groups (unsaturated bonds) present on the resulting oligomer obtained through the polymerization as in the case of the foregoing telomerization method.

Synthesis Example 3

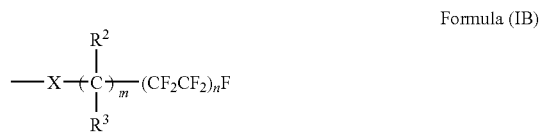

(B) Group Having a Structure Represented by Formula I

In the invention, comprising a polymerizable group (namely, fluorine-containing polymer) having a structure of the following Formula (I) is preferred from the viewpoint of uneven distribution in the ink surface.

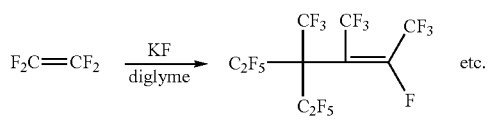

Formula (I)

In Formula (I), $R^2$ and $R^3$ each independently represent a hydrogen atom or an alkyl group having from 1 to 4 carbon atoms, mark * represents a connecting part to a polymer chain, X represents a covalent bond or a bivalent linking group (organic group), m represents an integer of 0 or more, and n represents an integer of 1 or more. In addition, when m is 2 or more, the functional groups on the carbon atoms adjacent to one another (namely, $R^2$'s or $R^3$'s bonding to carbon atoms adjacent to each other) may link together to form an aliphatic ring.

Regarding the fluorine-containing specific groups i-1) having a structure represented by the formula (I) shown above in the invention, the "n" in Formula (I) is preferably from 1 to 10, more preferably from 1 to 4, and particularly preferably 2 or 3.

That is, it has been found that the fluorine-containing polymer in the invention develops excellent performance when the structure of side chain portions bonding to polymer chains is the structure represented by Formula (IB) given below and n=2, 3 or 4.

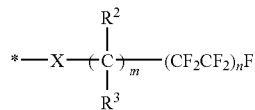

Formula (IB)

In Formula (IB), $R^2$, $R^3$, X, m and n each have the same meanings as those of $R_2$, $R_3$, X, m and n in Formula (I).

The alkyl groups having 1 to 4 carbon atoms represented by $R^2$ and $R^3$ in Formulas (I) and (IB) include a methyl group, an ethyl group, a propyl group, an isopropyl group, a n-butyl group, an isobutyl group, a tert-butyl group, a hydrogen atom and a methyl group are preferable as $R_2$ and $R_3$, and a hydrogen atom is more preferable.

In Formulae (I) and (IB), the covalent bond represented by X shows the case of directly bonding to a polymer main chain. Examples of such a bivalent linking group (organic group) include —O—, —S—, —N($R^4$)— and —CO—. Among these, —O— is particularly preferred.

$R^4$ represents a hydrogen atom or an alkyl group having 1 to 4 carbon atoms. Examples of the alkyl group include a methyl group, an ethyl group, a propyl group, an isopropyl group, a n-butyl group, an isobutyl group and a tert-butyl group. A hydrogen atom and a methyl group are preferable as $R^4$.

m represents an integer of 0 or more, and an integer of 2 to 8 is preferred. In particular, it is preferable that m=2. When m is 2 or more, functional groups on carbon atoms adjacent to one another may link together to form an aliphatic ring.

n represents an integer of 1 or more, and an integer of from 1 to 10 is preferred. Here, n is particularly preferably from 1 to 4, and it is desirable that n is 2 or 3 in the fluorine-containing polymer in the invention.

In Formula (I), mark * represents a connecting part to a polymer chain. Examples of the polymer chain are as follows. As examples of the polymer chain, acrylic resin, methacrylic resin, styryl resin, polyester resin, polyurethane resin, polycarbonate resin, polyamide resin, polyacetal resin, phenol/formaldehyde condensation resin, polyvinylphenol resin, maleic anhydride/α-olefin resin, α-hetero substituted methacrylic resin, or the like may be used. Among these, acrylic resin, methacrylic resin, styryl resin, polyester resin and polyurethane resin are useful, and acrylic resin, methacrylic resin, and polyurethane resin are particularly useful.

The specific polymer having the fluorine-substituted hydrocarbon group i-1) in the present invention can be easily obtained by methods known to persons skilled in the art involving, for example, suitably selecting a monomer (A) having the fluoroaliphatic group or a monomer (B) having the substituent group having a structure represented by Formula I, and performing condensation polymerization, addition polymerization, or ring opening polymerization. Furthermore, the specific polymer can be produced by mixing these monomers or mixing a polymer after polymerization as required.

(Fluorine Group-Containing Monomer Having a Polymerizable Group)

In the present invention, copolymerization to produce the specific polymer of the present invention can be carried out using the substituent group mentioned under (A) or (B) above and a monomer having a polymerizable group.

Examples of a preferable monomer having the substituent group mentioned under (A) or (B) and a polymerizable group include a monomer represented by Formula II.

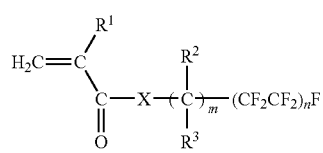

Formula (II)

In Formula (II), $R^1$ represents a hydrogen atom, a halogen atom, a methyl group which may have a substituent, or an ethyl group which may have a substituent. Further, $R^2$, $R^3$, X, m and n each have the same meanings as those of $R^2$, $R^3$, X, m and n in formula (IB).

Examples of the halogen atom represented by $R^1$ in Formula (II) include a fluorine atom, a chlorine atom and a bromine atom.

The following are specific examples of the monomers represented by Formula (II) used in the invention.

(n = 4)

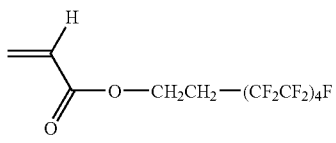
(F-1)

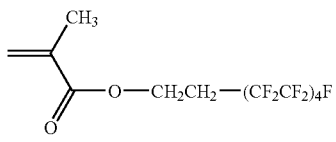
(F-2)

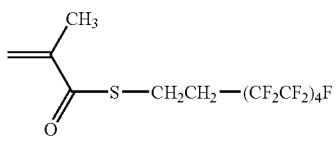
(F-3)

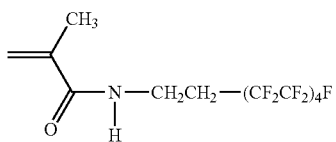
(F-4)

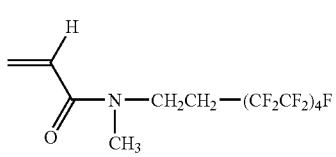
(F-5)

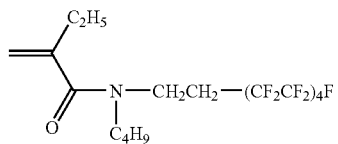
(F-6)

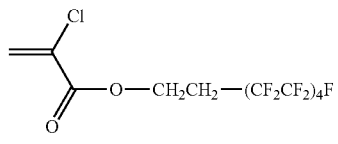
(F-7)

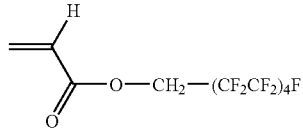
(F-8)

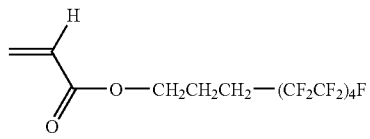
(F-9)

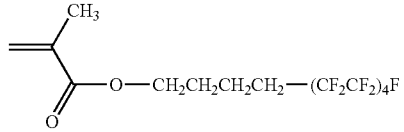
(F-10)

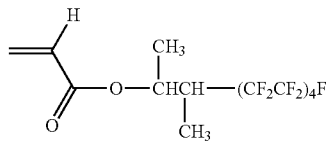
(F-11)

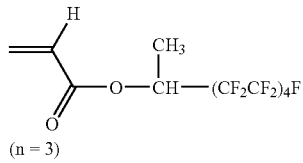
(F-12)

(n = 3)

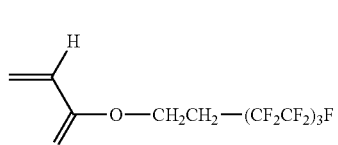
(F-13)

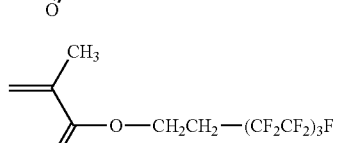
(F-14)

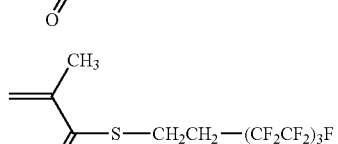
(F-15)

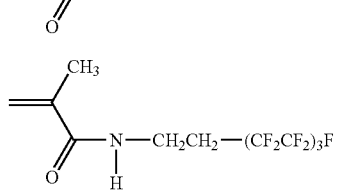
(F-16)

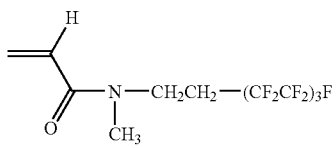 (F-17)
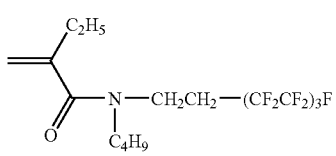 (F-18)
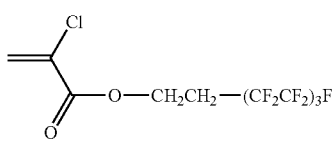 (F-19)
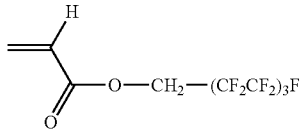 (F-20)
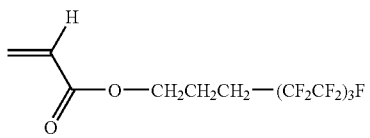 (F-21)
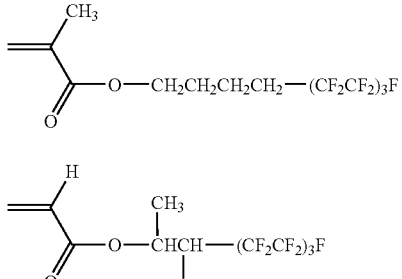 (F-22)
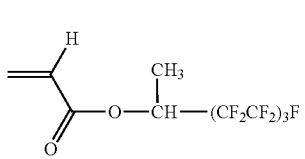 (F-23)
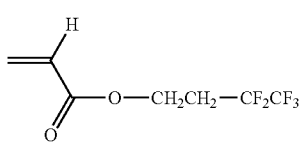 (F-24)
(n = 1)
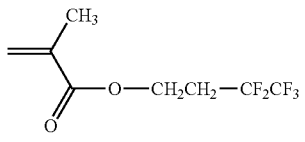 (F-25)
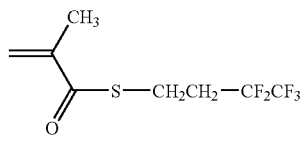 (F-26)
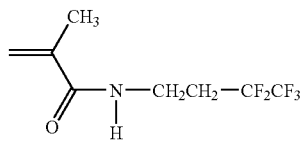 (F-27)
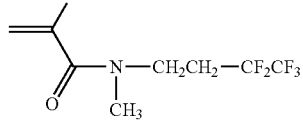 (F-28)
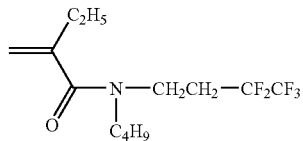 (F-29)
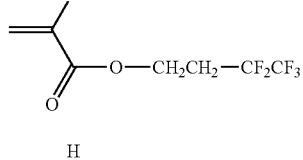 (F-30)
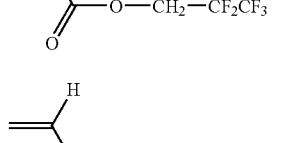 (F-31)
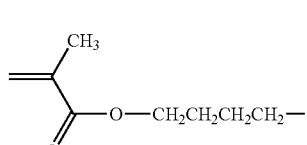 (F-32)
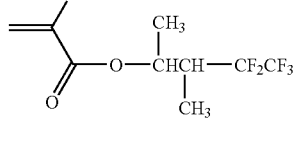 (F-33)
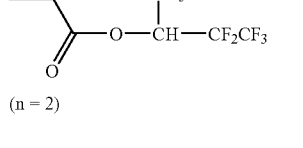 (F-34)
(F-35)
(F-36)
(n = 2)

-continued (F-37) 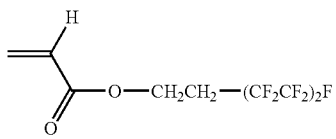

(F-38) 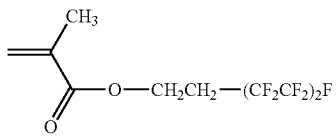

(F-39) 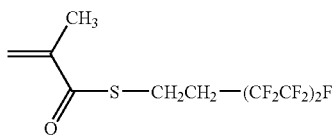

(F-40) 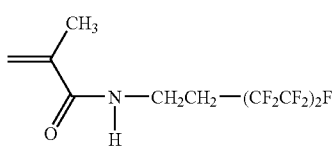

(F-41) 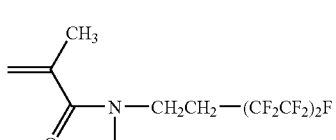

(F-42) 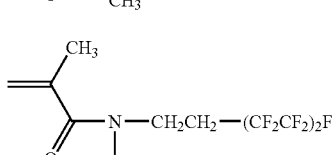

(F-43) 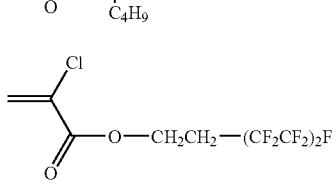

(F-44) 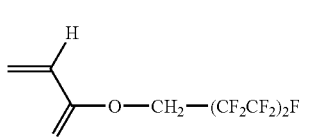

(F-45) 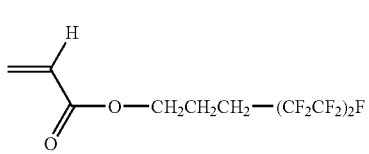

(F-46) 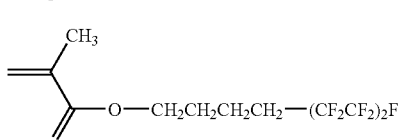

(F-47) 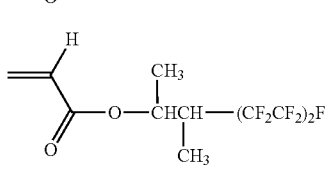

-continued (F-48) 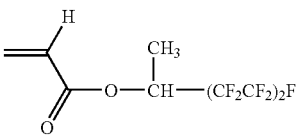

As monomers for use in the production of the specific polymers (the fluorine-containing polymers) in the invention, monomers having an "n" in formula (II) of from 1 to 10 are preferred, more preferably from 1 to 4, and particularly preferably 2 or 3 among the fluorine-containing monomers represented by formula (II).

<i-2> Siloxane Skeleton>

The siloxane skeleton i-2) which is a specific site in the specific polymer contained in the ink composition of the present invention can be used without limitation insofar as it has a siloxane skeleton in the molecule.

As the siloxane skeleton, polysiloxane is preferable in which a compound represented by Formula (A) (hereinafter also referred to as "a specific siloxane compound") has been polymerized from the viewpoint of increasing discharge stability of an ink composition and increasing surface segregation properties when an ink composition is formed into a coating film. In Formula (A), $R^1$ is introduced as a connecting group with an Si atom of a siloxane bond.

Formula (A)

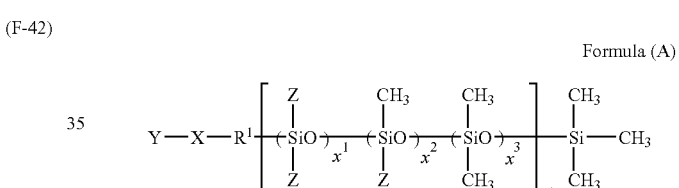

In Formula (A), $R^1$ represents a straight or branched alkylene group having 2 to 6 carbon atoms or a divalent connecting group represented by Formula (B).

Formula (B)

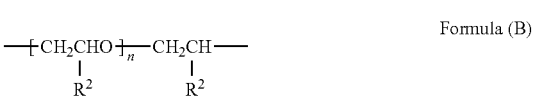

In Formula (B), $R^2$ represents a hydrogen atom or a methyl group and n is an integer of from 1 to 50.

In Formula (A), $x^1$, $x^2$, and $x^3$ each represents an integer in which the total of $x^1$, $x^2$, and $x^3$ is from 1 to 100. $y^1$ represents an integer of from 1 to 10.

In Formula (A), X represents a single bond or a divalent group represented by Formula (C).

$$-Z^1-CO-NH-R^3-NH-CO-\qquad \text{Formula (C)}$$

In Formula (C), $Z^1$ represents an oxygen atom, a sulfur atom, or $NR^4$, and $R^4$ represents a hydrogen atom or an alkyl group having 1 to 4 carbon atoms.

In Formula (C), $Z^1$ is bonded to $R^1$ in Formula (A).

In Formula (C), $R^3$ represents a divalent aliphatic or alicyclic group having 6 to 10 carbon atoms.

In Formula (A), Y represents a monovalent group represented by Formulae (D) to (F).

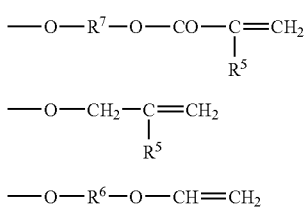

In Formulae (D) to (F), $R^5$ represents a hydrogen atom or a straight chain or branched chain alkyl group having 1 to 6 carbon atoms, $R^6$ represents a straight chain or branched chain alkylene group having 2 to 10 carbon atoms, and $R^7$ represents a straight chain or branched chain alkylene group having 1 to 6 carbon atoms.

In Formula (A), Z represents a monovalent group represented by the following structure.

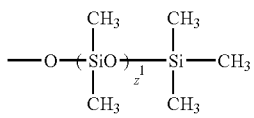

In the structure, $z^1$ represents an integer of from 3 to 100, preferably from 5 to 50, and more preferably from 7 to 20.

<i-3> Long-Chain Alkyl Group>

The long-chain alkyl group i-3) which is a specific site in the specific polymer contained in the ink composition of the present invention is a substituent group represented by $-C_nH_{2n+1}$ in Formula (1), and is preferably introduced into a polymer in the form represented by Formula (I).

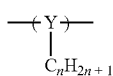

In Formula (1), n represents an integer of from 6 to 40, preferably from 10 to 30, and more preferably from 12 to 20 from the viewpoint of surface segregation properties.

Y represents a trivalent connecting group. A long-chain alkyl group can be bonded to a polymer side chain via the connecting group.

Examples of a preferable structural unit represented by Formula (1) are represented by Formula (1-2), but the present invention is not limited thereto.

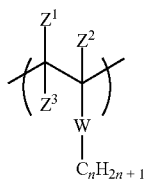

In Formula (1-2), n represents an integer of from 6 to 40. W represents a divalent connecting group, and $Z^1$, $Z^2$, and $Z^3$ each independently represent a hydrogen atom or a monovalent organic group.

Moreover, a plurality of such long-chain alkyl groups may be contained in the structural unit. In such a case, an aspect in which a long-chain alkyl group is bonded to the $Z^1$ position or $Z^3$ position via a connecting group W and an aspect in which the connecting group W has a branch structure and another long-chain alkyl group is bonded to the end thereof can be employed.

Examples of the connecting group W include a straight chain or branched alkylene having 1 to 20 carbon atoms, a chain or cyclic alkylene having 1 to 20 carbon atoms, a straight chain or branched alkenylene having 2 to 20 carbon atoms or a chain or cyclic alkenylene having 2 to 20 carbon atoms, an alkynyl group having 2 to 20 carbon atoms, arylene (monocyclic or heterocyclic ring) having 6 to 20 carbon atoms, —OC (=O)—, —OC (=O) Ar—, —OC (=O) O—, —OC (=O) OAr—, —C (=O) NR—, —C (=O) NAr'—, —SO₂NR—, —SO₂NAr—, —O— (alkyleneoxy, polyalkylene oxy), —OAr— (arylenoxy, polyaryleneoxy), —C (=O) O—, —C (=O) O—Ar—, —C (=O) Ar—, —C (=O)—, —SO₂O—, —SO₂OAr—, —OSO₂—, —OSO₂Ar—, —NRSO₂—, —NArSO₂—, —NRC (=O) —, —NArC (=O)—, —NRC (=O) O—, —NArC (=O) O—, —OC (=O) NR—, —OC (=O) NAr—, —NAr—, —NR—, —N+RR'—, —N+RAr—, —N+ArAr'—, —S—, —SAr—, —ArS—, a heterocyclic group (as a hetero atom, 3- to 12-membered monocyclic or condensed ring containing at least one of nitrogen, oxygen, sulfur, etc.), —OC (=S)—, —OC (=S) Ar—, —C (=S) O—, —C (=S) OAr—, —C (=O) S—, —C (=O) SAr—, —ArC (=O)—, —ArC (=O) NR—, —ArC (=O) NAr—, —ArC (=O) O—, —ArC (=O) S—, —ArC (=S) O—, —ArO—, and —ArNR—.

It should be noted that the above-mentioned R and R' represent a hydrogen atom, a straight chain or branched alkyl group, a chain or cyclic alkyl group, a straight chain or branched alkenyl group, a chain or cyclic alkenyl group, a straight chain or branched alkynyl group, and a chain or cyclic alkynyl group, and that Ar and Ar' represent an aryl group.

In such a connecting group, arylene (monocyclic or heterocyclic ring) having 6 to 20 carbon atoms, —C (=O) NR—, —C (=O) NAr—, —O— (alkyleneoxy, polyalkyleneoxy), —OAr— (arylenoxy, polyaryleneoxy), —C (=O) O—, —C (=O) O—Ar—, —C (=O) —, —C (=O) Ar—, —S—, —SAr—, —ArS—, —ArC (=O) —, —ArC (=O) O—, —ArO—, and —ArNR— are preferable. Arylene (monocyclic or heterocyclic ring) having 6 to 20 carbon atoms, —C (=O) NR—, —C (=O) NAr—, —O— (alkyleneoxy, polyalkyleneoxy), —OAr— (arylenoxy, polyaryleneoxy), —C (=O) O—, —C (=O) O—Ar—, —SAr—, —ArS—, —ArC (=O)—, —ArC (=O) O—, —ArO—, and —ArNR— are more preferable.

In the present invention, two or more kinds of the connecting groups mentioned here may be combined as the connecting group represented by W.

In Formula (1-2), $Z^1$, $Z^2$, and $Z^3$ each independently include a hydrogen atom, a straight chain or branched alkyl group having 1 to 20 carbon atoms or a chain or cyclic alkyl group having 1 to 20 carbon atoms (e.g., methyl, ethyl, propyl, heptafluoropropyl, isopropyl, butyl, t-butyl, t-pentyl, cyclopentyl, cyclohexyl, octyl, 2-ethylhexyl, and dodecyl), a straight chain or branched alkenyl group having 1 to 20 carbon atoms or a chain or cyclic alkenyl group having 1 to 20 carbon atoms (e.g., vinyl, 1-methylvinyl, and cyclohexene-1-yl), an alkynyl group having 2 to 20 carbon atoms (e.g., ethynyl and 1-propynyl), an aryl group having 6 to 20 carbon atoms (e.g., phenyl, naphthyl, and anthryl), an acyloxy group having 1 to 20 carbon atoms (e.g., acetoxy, tetradecanoyloxy, and benzoyloxy), an alkoxy carbonyloxy group having 2 to 20 carbon atoms (e.g., a methoxycarbonyloxy group and a 2-methoxyethoxy carbonyloxy group), an aryloxy carbonyloxy group having 7 to 20 carbon atoms (e.g., a phenoxy carbonyloxy group), a carbamoyloxy group having 1 to 20 carbon atoms (e.g., N,N-dimethylcarbamoyloxy), a carbonamide group having 1 to 20 carbon atoms (e.g., formamide, N-methylacetamide, acetamide, N-methylformamide, and vent amide), a sulfonamide group having 1 to 20 carbon atoms (e.g., methanesulfon amide, dodecanesulfonamide, benzenesulfonamide, and p-toluenesulfonamide), a carbamoyl group having 1 to 20 carbon atoms (e.g., N-methylcarbamoyl, N,N-diethylcarbamoyl, and N-mesylcarbamoyl), a sulfamoyl having 0 to 20 carbon atoms (e.g., N-butyl sulfamoyl, N,N-diethyl sulfamoyl, and N-methyl-N-(4-methoxyphenyl)sulfamoyl), an alkoxy group having 1 to 20 carbon atoms (e.g., methoxy, propoxy, isopropoxy, octyloxy, t-octyloxy, dodecyloxy, 2-(2,4-di-t-pentylphenoxy)ethoxy, and polyalkyleneoxy), an aryloxy having 6 to 20 carbon atoms (e.g., phenoxy, 4-methoxyphenoxy, and naphthoxy), an aryloxycarbonyl group having 7 to 20 carbon atoms (e.g., phenoxycarbonyl and naphthoxy carbonyl), an alkoxycarbonyl group having 2 to 20 carbon atoms (e.g., carbomethoxy and t-butoxycarbonyl), an N-acyl sulfamoyl group having 1 to 20 carbon atoms (e.g., N-tetradecanoyl sulfamoyl and N-benzoyl sulfamoyl), an N-sulfamoyl carbamoyl group having 1 to 20 carbon atoms (e.g., N-methanesulfonyl carbamoyl group), an alkyl sulfonyl group having 1 to 20 carbon atoms (e.g., methanesulfonyl, octylsulfonyl, 2-methoxyethylsulfonyl, and 2-hexyldecyl sulfonyl), an aryl sulfonyl group having 6 to 20 carbon atoms (e.g., benzenesulphonyl, p-toluenesulfonyl, and 4-phenylsulfonylphenylsulfonyl), an alkoxycarbonylamino group having 2 to 20 carbon atoms (e.g., ethoxycarbonylamino), an aryloxycarbonylamino group having 7 to 20 carbon atoms (e.g., phenoxycarbonylamino and naphthoxycarbonylamino), an amino group having 0 to 20 carbon atoms (e.g., amino, methylamino, diethylamino, diisopropylamino, anilino, and morpholino), an ammonio group having 3 to 20 carbon atoms (e.g., a trimethylammonio group and a dimethylbenzylammonio group), a cyano group, a nitro group, a carboxyl group, a hydroxyl group, a sulfo group, a mercapto group, an alkylsulfinyl group having 1 to 20 carbon atoms (e.g., methanesulfinyl and octanesulfinyl), an arylsulfinyl group having 6 to 20 carbon atoms (e.g., benzenesulfinyl, 4-chlorophenylsulfinyl, and p-toluenesulfinyl), an alkylthio group having 1 to 20 carbon atoms, (e.g., methylthio, octylthio, and cyclohexylthio), an arylthio group having 6 to 20 carbon atoms (e.g., phenylthio and naphthyl thio), an ureido group having 1 to 20 carbon atoms (e.g., 3-methylureido, 3,3-dimethylureido, and 1,3-diphenylureido), a heterocyclic group having 2 to 20 carbon atoms (as a hetero atom, 3- to 12-membered monocyclic or condensed ring containing at least one of nitrogen, oxygen, sulfur, etc., e.g., 2-furyl, 2-pyranyl, 2-pyridyl, 2-thienyl, 2-imidazolyl, morpholino, 2-quinolyl, 2-benzimidazolyl, 2-benzothiazolyl, and 2-benzoxazolyl), an acyl group having 1 to 20 carbon atoms (e.g., acety, benzoyl, and trifluoroacetyl), a sulfamoylamino group having 0 to 20 carbon atoms (e.g., N-butylsulfamoylamino and N-phenylsulfamoylamino), a silyl group having 3 to 50 carbon atoms (e.g., trimethylsilyl, dimethyl-t-butylsilyl, and triphenylsilyl), an azo group, and a halogen atom (e.g., a fluorine atom, a chlorine atom, and a bromine atom).

When $Z^1$ to $Z^3$ represent a hydrogen atom or atoms other than a halogen atom, $Z^1$ to $Z^3$ may have a substituent group. Examples of the substituent group include the same substituent groups mentioned above as specific examples.

Preferable examples of $Z^1$ to $Z^3$ include a hydrogen atom, a straight chain or branched alkyl group having 1 to 20 carbon atoms, a chain or cyclic alkyl group having 1 to 20 carbon atoms, an aryl group having 6 to 20 carbon atoms, an acyloxy group having 1 to 20 carbon atoms, a carbonamide group having 1 to 20 carbon atoms, an alkoxy group having 1 to 20 carbon atoms, an aryl oxy group having 6 to 20 carbon atoms, an aryloxycarbonyl group having 7 to 20 carbon atoms, an alkoxycarbonyl group having 2 to 20 carbon atoms, an amino group having 0 to 20 carbon atoms, a cyano group, a hydroxy group, and a halogen atom. More preferable examples of $Z^1$ to $Z^3$ include a hydrogen atom, a straight chain or branched alkyl group having 1 to 20 carbon atoms, or a chain or cyclic alkyl group having 1 to 20 carbon atoms, an aryl group having 6 to 20 carbon atoms, an acyloxy group having 1 to 20 carbon atoms, an alkoxy group having 1 to 20 carbon atoms, an aryloxy group having 6 to 20 carbon atoms, an aryloxycarbonyl group having 7 to 20 carbon atoms, an alkoxycarbonyl group having 2 to 20 carbon atoms, an amino group having 0 to 20 carbon atoms, a cyano group, and a halogen atom.

It is preferable that the structural unit represented by Formula (1-2) be a structural unit represented by Formula (1-3) from the viewpoint of segregation properties to an ink surface.

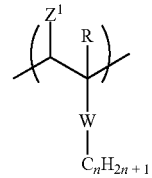

Formula (1-3)

In Formula (1-3), n represents an integer of from 6 to 40 and R represents a hydrogen atom or a methyl group.

W is the same as mentioned above for Formula (1-2). Hereinafter, particularly preferable examples as a divalent substituent group represented by W from the viewpoint of segregation properties to an ink surface will be mentioned, but the present invention is not limited thereto.

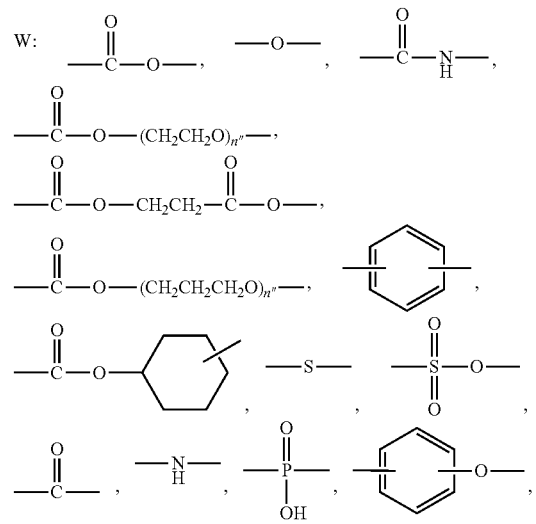

-continued

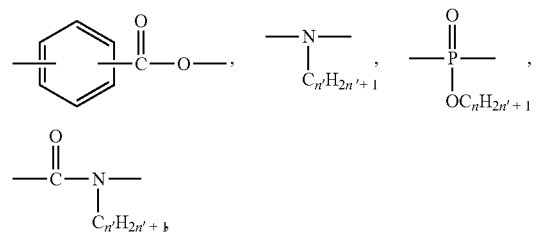

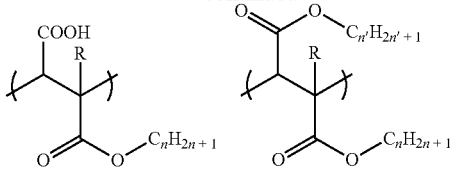

($n' = 1 \sim 40, n'' = 1 \sim 20$)

$Z^1$ is the same as mentioned above for Formula (1-2). Hereinafter, particularly preferable examples as a monovalent organic group represented by $Z^1$ from the viewpoint of a stable solubility of an ink composition will be described, but the present invention is not limited thereto.

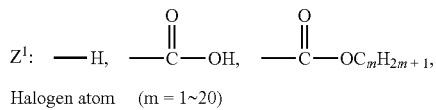

Halogen atom   (m = 1~20)

Here, specific examples of a structural unit having a long-chain alkyl group in the present invention will be mentioned as follows, but the present invention is not limited thereto.

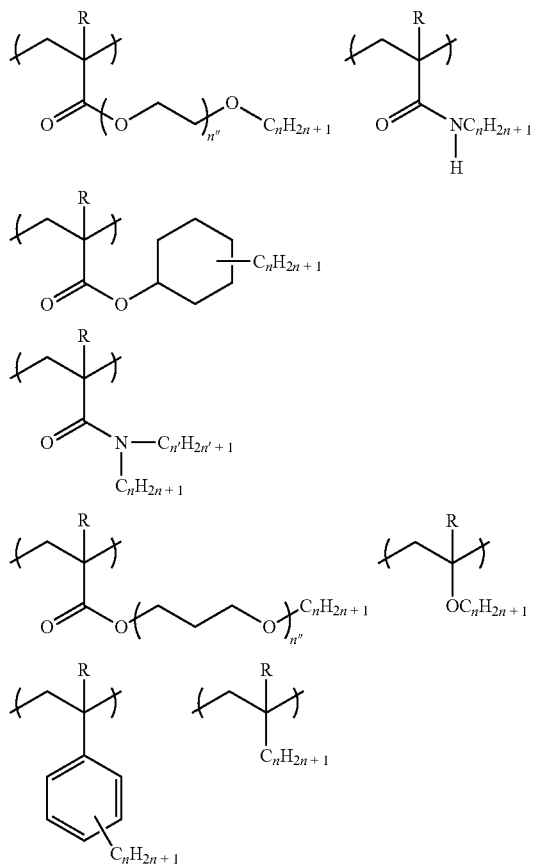

R represents a hydrogen atom or a methyl group.
n=6~40, n'=1~40

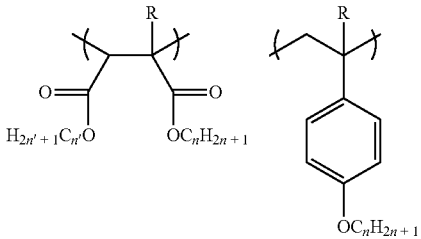

R represents a hydrogen atom or a methyl group.
n=6~40, n'=1~40 n''=1~20

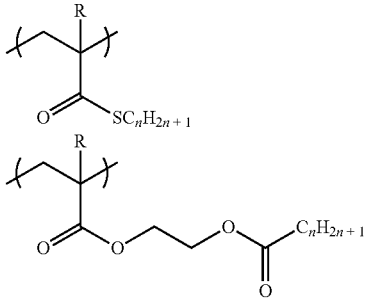

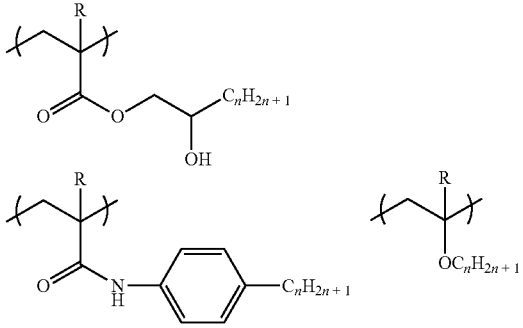

In the present invention, the content of a partial structure (specific site) selected from the group consisting of the fluorine-substituted hydrocarbon group i-1), the siloxane skeleton i-2), and the long-chain alkyl group i-3) in the specific polymer is preferably from 3% by mass to 60% by mass, more preferably from 3% by mass to 50% by mass, and still more preferably from 5% by mass to 40% by mass. By adjusting the content thereof to the above-mentioned ranges, surface segregation of the polymer having the specific site can be efficiently carried out in the ink composition.

In the case where two or more partial structures selected from the group consisting of the fluorine-substituted hydrocarbon group i-1), the siloxane skeleton i-2), and the long-chain alkyl group i-3) are contained, the total content of specific sites is from 3% by mass to 60% by mass, preferably from 3% by mass to 50% by mass, and more preferably from 5% by mass to 40% by mass, relative to the specific polymer.

Based on the total solid content of the ink composition in the present invention, the content of a partial structure (specific site) selected from the group consisting of the fluorine-substituted hydrocarbon group i-1), the siloxane skeleton i-2), and the long-chain alkyl group i-3) is preferably from 0.1% by mass to 20% by mass, more preferably from 0.5% by mass to 15% by mass, and still more preferably from 1% by mass to 10% by mass. By adjusting the content to the above-mentioned ranges, excellent surface curing properties and blocking inhibition are achieved and a surface tension (22 mN/m to 28 mN/m) and moderate viscosity which allow discharge are achieved.

<(ii) Radical Polymerizable Group>

The specific polymer contained in the ink composition of the present invention further contains a radical polymerizable group. By containing the radical polymerizable group, curing properties of an ink composition are increased, surface stickiness is controlled, and blocking properties are improved.

Examples of the radical polymerizable group include a polymerizable group having an ethylenically unsaturated bond which can be subjected to radical polymerization. Any substituent groups may be used insofar as they have, in a polymer, at least one ethylenically unsaturated bond which can be subjected to radical polymerization. Examples of the polymerizable group having an ethylenically unsaturated bond which can be subjected to radical polymerization include an unsaturated carboxylic acid ester group, such as an acrylate group, a methacrylate group, an itaconate group, a crotonate group, an isocrotonate group, and a maleate group and a radical polymerizable group, such as a styrene group. Among the above, a methacrylate group and an acrylic ester group are preferable.

The content, in the specific polymer, of the radical polymerizable group is preferably from 5 mol/% to 90 mol/%, more preferably from 5 mol % to 85 mol %, and still more preferably from 10 mol % to 80 mol %.

Examples of a method of introducing the radical polymerizable group to produce the specific polymer include a method of converting a double bond of a radical polymerizable group to a double bond by sealing a reaction using a protective group, copolymerizing, and removing the protective group and a method involving introducing a low molecular weight compound having a radical polymerizable group to produce the specific polymer by a polymer reaction.

<Tertiary Amine Structure>

The specific polymer contained in the ink composition of the present invention further has a tertiary amine structure.

As the tertiary amine structure, the following structure is preferable. In order not to impair dispersibility of a pigment, hindered amine with low nucleophilicity is particularly preferable.

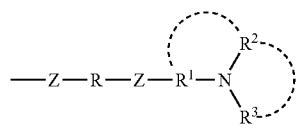

In the above-mentioned structure, R and $R^1$ represent a straight chain, branched, or cyclic alkylene group having 1 to 6 carbon atoms. Z represents an oxygen atom, —C (=O) O—, —OC (=O) NH—, or —NHC (=O) NH—. $R^2$ and $R^3$ represent a straight chain, branched, or cyclic alkyl group having 1 to 6 carbon atoms. $R^1$ and $R^2$ or $R^2$ and $R^3$ may be mutually bonded to each other to form a ring having 5 to 7 carbon atoms. It should be noted that the ring may have an substituent group.

The content of a tertiary amine structure in the polymer compound is preferably from 5 to 40 mol %, more preferably from 5 to 30 mol %, and still more preferably from 5 to 15 mol %. By adjusting the tertiary amine structure to the above-mentioned ranges, surface curing properties can be increased.

A preferable aspect as a main chain structure of the specific polymer contained in the ink composition of the present invention is methacrylic resin or acrylic resin.

The weight average molecular weight of the specific polymer is preferably from 3,000 to 200,000, more preferably from 5,000 to 100,000, and still more preferably from 10,000 to 80,000. By adjusting the weight average molecular weight of the specific polymer to the above-mentioned ranges, moderate viscosity is achieved and handling properties and blocking inhibition are excellent.

The content of the specific polymer contained in the ink composition of the present invention is preferably from 0.2% by mass to 5% by mass, more preferably from 0.2% by mass to 3% by mass, and still more preferably from 0.2% by mass to 1.5% by mass based on the total solid content of the ink composition.

Hereinafter, specific preferable examples of the polymer having a fluorine-substituted hydrocarbon group, a polymerizable group, and a tertiary amine structure in the present invention. It should be noted that the present invention is not limited to the specific examples at all.

A-1

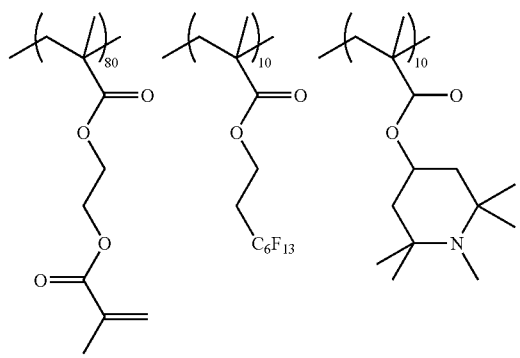

Mw = 20000

A-2

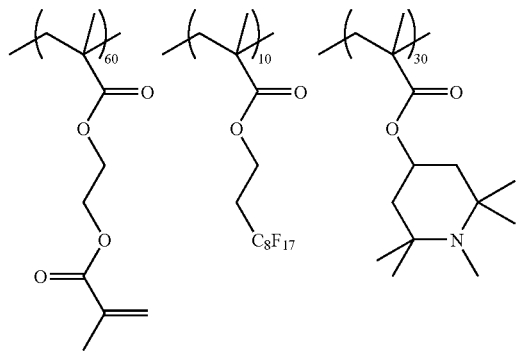

Mw = 20000

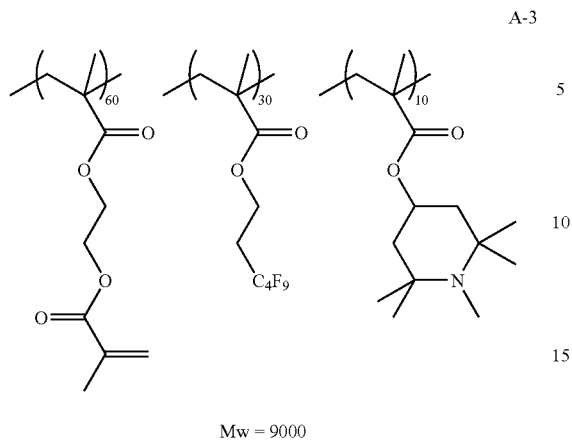
A-3
Mw = 9000
A-4
Mw = 12000
A-5
Mw = 20000
A-6
Mw = 6000
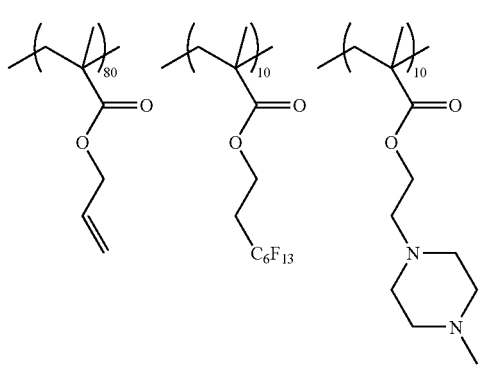
A-7
Mw = 10000
A-8
Mw = 10000
A-9
Mw = 10000
Specific preferable examples of the polymer having a siloxane skeleton, a polymerizable group, and a tertiary amine structure in the present invention are shown below. It should be noted that the present invention is not limited to the examples at all.
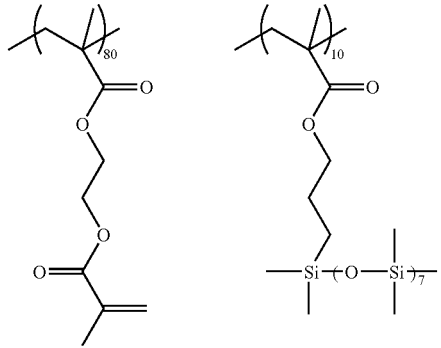
A-10

-continued
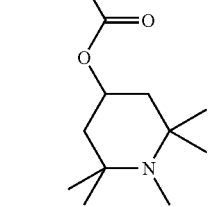
Mw = 12000
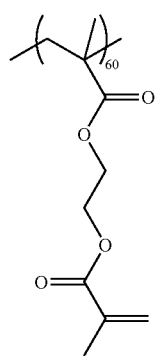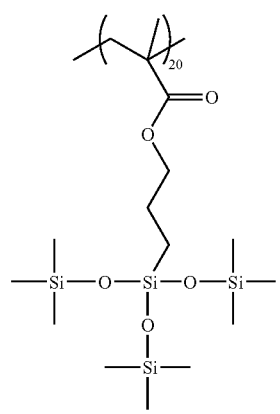
Mw = 12000
A-11
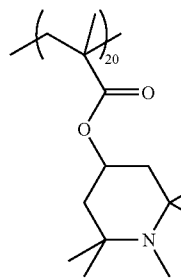
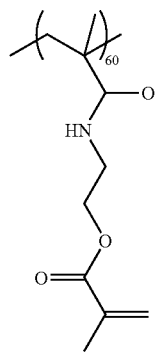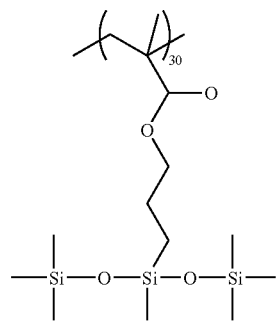
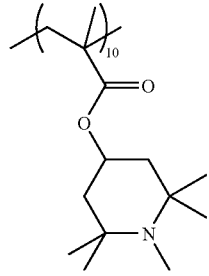
Mw = 12000
A-12
-continued
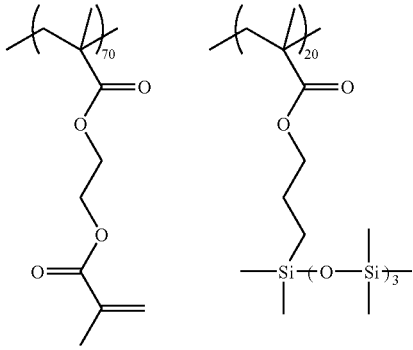
A-13
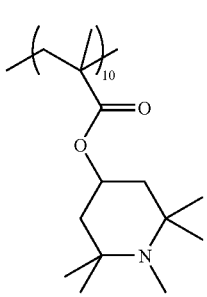
Mw = 12000
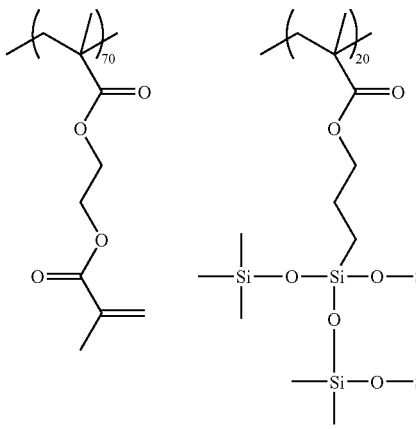
A-14
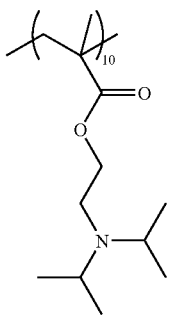
Mw = 12000

A-15
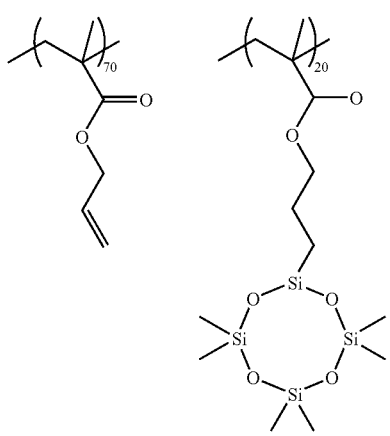
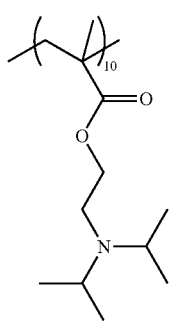
Mw = 12000
A-16
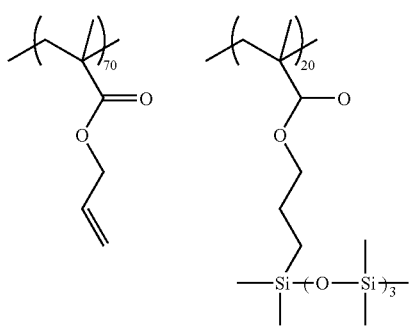
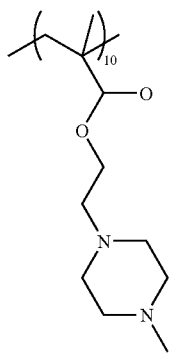
Mw = 12000
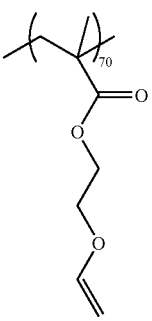
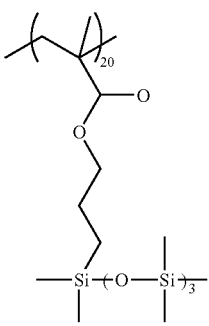
A-17
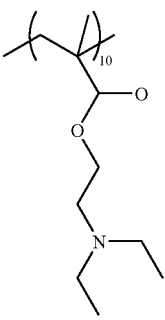
Mw = 12000
A-18
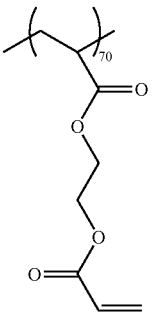
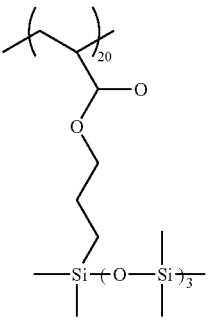
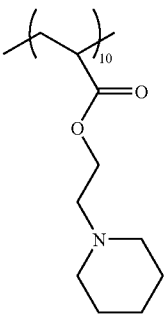
Mw = 12000
Specific preferable examples of the polymer having a long-chain alkyl group, a polymerizable group, and a tertiary amine structure in the present invention are shown below. It should be noted that the present invention is not limited to the examples at all.

A-19
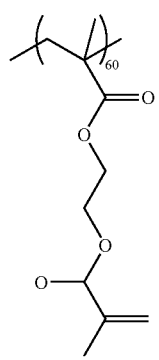
Mw = 15000
A-20
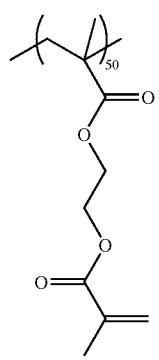
Mw = 15000
A-21
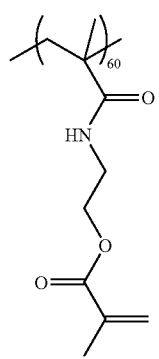
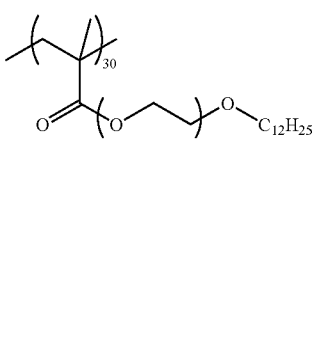
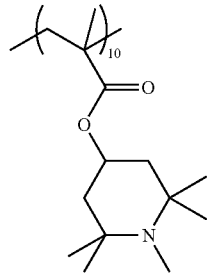
Mw = 15000
-continued
A-22
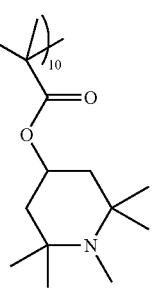 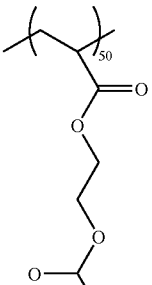
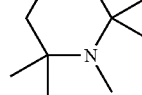 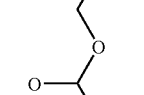 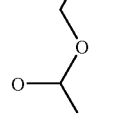
Mw = 15000
A-23
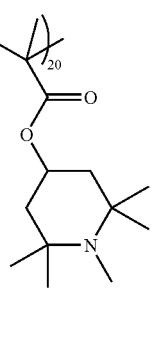
Mw = 20000
A-24
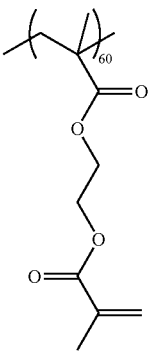 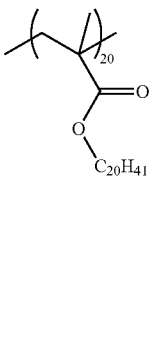 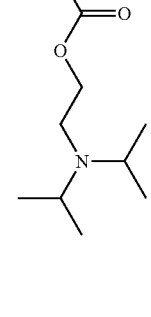
Mw = 20000
A-25
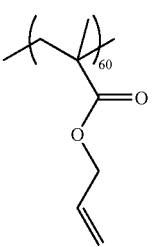 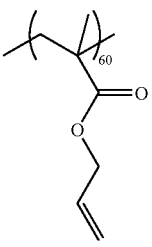 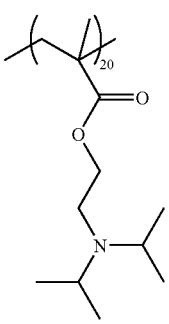
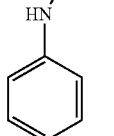
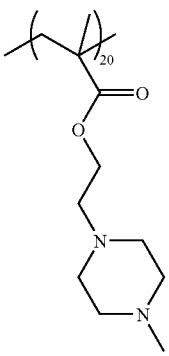
Mw = 20000

A-26

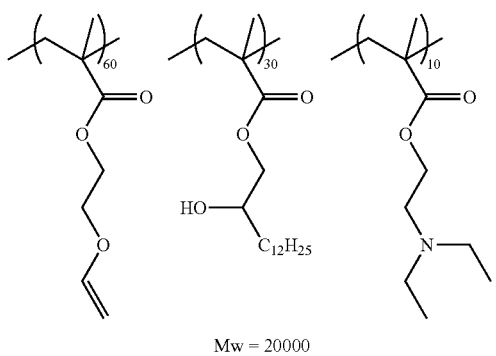

Mw = 20000

<(b) Radical Polymerizable Compound>

It is preferable for the ink composition of the present invention to further contain a radical polymerizable compound.

Any radical polymerizable compounds may be used insofar as they are compounds having an ethylenically unsaturated bond which can be subjected to radical polymerization and having, in the molecule, at least one ethylenically unsaturated bond which can be subjected to radical polymerization. Compounds having a chemical configuration, such as a monomer, an oligomer, or a polymer, are included. Only one kind of the radical polymerizable compound may be used or two or more kinds thereof may be used in combination with suitable proportions so as to increase the target properties. It is preferable to use two or more kinds of the radical polymerizable compounds in terms of controlling performance, such as reactivity and physical properties.

Examples of the compounds having a radically-polymerizable ethylenically-unsaturated bond include radical polymerizable compounds such as; unsaturated carboxylic acids such as acrylic acid, methacrylic acid, itaconic acid, crotonic acid, isocrotonic acid and maleic acid and salts thereof, anhydrides having an ethylenically unsaturated group, acrylonitorile, styrene, various types of unsaturated polyesters, unsaturated polyethers, unsaturated polyamides, and unsaturated urethanes.

Specific examples include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis (4-acryloxypolyethoxyphenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide and epoxyacrylate; methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, and 2,2-bis(4-methacryloxy polyethoxyphenyl)propane; and allyl compound derivatives such as allyl glycidyl ether, diallyl phthalate and triallyl trimellitate. Further specifically, commercially available or well known in the industry, radically polimerizable or crosslinkable monomers, oligomers and polymers described in "Crosslinking Agent Handbook" editted by Shinzo Yamashita (1981, Taiseisha); "UV•EB Curing Handbook (ingredient part)" edited by Kiyoshi Kato (1985, Koubunshi-kankoukai); P. 79 in "Application and Market of UV•EB curing technique" edited by RadTech Japan (1989, CMC); "Polyester Resin Handbook" written by Eiichiro Takiyama (1988, The Nikkan Kogyo Shinbun, Ltd.) or the like, may be used.

Examples of known radical polymerizable compounds include photocurable type polymerizable compounds used for the photopolymerizable compositions described in JP-A No. 7-159983, JP-B No. 7-31399 and JP-A Nos. 8-224982, 10-863, and 9-134011. These may be applied to the ink composition of the invention.

Use of a vinyl ether compound as the radical polymerizable compound is also preferred. Examples of vinyl ether compounds favorably used include di- or trivinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexanedimethanol divinyl ether, hydroxyethyl monovinyl ether, hydroxynonyl monovinyl ether and trimethylolpropane trivinyl ether; and monovinyl ether compounds such as ethyl vinyl ether, n-butyl vinyl ether, isobutyl vinyl ether, octadecyl vinyl ester, cyclohexyl vinyl ester, hydroxybutyl vinyl ether, 2-ethylhexyl vinyl ether, cyclohexanedimethanol monovinyl ether, n-propyl vinyl ether, isopropyl vinyl ether, isopropenyl ether-O-propylene carbonate, dodecyl vinyl ether, diethylene glycol monovinyl ether and octadecyl vinyl ether. Among such vinyl ether compounds, divinyl ether compounds and trivinyl ether compounds are preferred, and divinyl ether compounds are particularly preferred from the viewpoint of curability, adhesiveness and surface hardness. Vinyl ether compounds may be used either singly or in combination of two or more species thereof selected at will.

The content of the radical polymerizable compound is preferably from 50% by mass to 90% by mass, more preferably from 55% by mass to 90% by mass, and still more preferably 60% by mass to 85% by mass based on the total solid content of the ink composition of the present invention. By adjusting the content of the radical polymerizable compound to the above-mentioned ranges, a coating film with favorable curing properties and color reproduction properties is obtained. Furthermore, in order to increase flexibility of a coating film, the content of a monofunctional monomer in the radical polymerizable compound is preferably from 60% by mass to 100% by mass, more preferably from 70% by mass to 100% by mass, and still more preferably from 80% by mass to 100% by mass.

<(c) Photoinitiator>

It is preferable for the ink composition of the present invention to contain a radical polymerization initiator as a photoinitiator.

As a radical polymerization initiator, known polymerization initiators can be suitably selected for use according to the type of a polymerizable compound to be used in combination and the intended use of an ink composition. The radical polymerization initiator for use in the ink composition of the present invention is a compound which absorbs external energy to generate a polymerization initiation species. The external energy used for initiating polymerization is roughly classified into heat and a radiation ray, and a thermal polymerization initiator and a photopolymerization initiator are used as heat and a radiation ray, respectively. Examples of a radiation ray include γ-rays, β-rays, electron beams, ultraviolet rays, visible rays, and infrared rays.

As the thermal polymerization initiator and the photopolymerization initiator, known compounds can be used.

Examples of a preferable radical polymerization initiator which can be used in the present invention include (a) aromatic ketones, (b) an acylphosphine oxide compound, (c) an aromatic onium salt compound, (d) an organic peroxide, (e) a thiocompound, (f) a hexaaryl biimidazole compound, (g) a ketoxime ester compound, (h) a borate compound, (i) an adinium compound, (j) a metallocene compound, (k) an active-ester compound, (l) a compound having a carbon halogen bond, and (m) an alkylamine compound.

In the present invention, the radical polymerization initiators may be used singly or in combination. It is preferable to use in combination two or more kinds of the radical polymerization initiators from the viewpoint of effects.

The content of the initiator in the ink composition is preferably from 0.1% by mass to 20% by mass, more preferably from 0.5% by mass to 10% by mass, and still more preferably from 1% by mass to 7% by mass in terms of the total solid content of the ink composition.

It is appropriate that the radical polymerization initiator is contained at a mass ratio of the polymerization initiator:a sensitizing dye (which is mentioned later and can be used as required) in the range of from 200:1 to 1:200, preferably from 50:1 to 1:50, and more preferably from 20:1 to 1:5 relative to the sensitizing dye.

<Coloring Agent>

The ink composition according to the invention preferably contains a coloring agent for producing a colored image. The coloring agent useful in the invention is not particularly limited, but is preferably a pigment or an oil soluble dye having excellent weather resistance and color reproducibility, and may be optionally selected from known coloring agents such as solubility dyes. The coloring agent suitable to the ink composition according to the invention preferably does not function as a polymerization inhibitor in the polymerization reaction for curing. This is to prevent the decrease in the sensitivity of the curing reaction by active radiation.

<Pigment>

The pigment is not particularly limited, and any one of common commercially available pigments, including organic and inorganic pigments, dispersions of the pigment dispersed in an insoluble resin, and pigments surface-grafted with a resin, may be used. In addition, dyed resin particles may also be used. Such pigments include the pigments described, for example, in Seijiro Itoh Ed., "Ganryo no Jiten (Dictionary of Pigments)" (2000), W. Herbst K. Hunger, Industrial Organic Pigments", and JP-A Nos. 2002-12607, 2002-188025, 2003-26978, and 2003-342503.

Specific Examples of the organic and inorganic pigments exhibiting yellow color employable in the invention include monoazo pigments such as C.I. Pigment Yellow 1 (Fast Yellow G, etc.) and C.I. Pigment Yellow 74, disazo pigments such as C.I. Pigment Yellow 12 (Disazo Yellow AAA, etc.) and C.I. Pigment Yellow 17, non-benzidine azo pigments such as C.I. Pigment Yellow 180, azolake pigments such as C.I. Pigment Yellow 100 (tartrazine yellow lake, etc.), condensation azo pigments such as C.I. Pigment Yellow 95 (condensation azo yellow GR, etc.), acidic dye lake pigments such as C.I. Pigment Yellow 115 (quinoline yellow lake, etc.), basic dye lake pigments such as C.I. Pigment Yellow 18 (thioflavin lake, etc.), anthraquinone pigments such as fravantrone yellow (Y-24), isoindolinone pigments such as isoindolinone yellow 3RLT (Y-110), quinophtharone pigments such as quinophtharone yellow (Y-138), isoindoline pigments such as isoindoline yellow (Y-139), nitroso pigments such as C.I. Pigment Yellow 153 (nickel nitroso yellow, etc.), metal complex salt azomethine pigments such as C.I. Pigment Yellow 117 (copper azomethine yellow, etc.), and the like.

Examples thereof exhibiting red or magenta color include monoazo pigments such as C.I. Pigment Red 3 (toluidine red, etc.), disazo pigments such as C.I. pigment red 38 (pyrazolone red B, etc.), azolake pigments such as C.I. Pigment Red 53:1 (lake red C, etc.) and C.I. Pigment Red 57:1 (Brilliant Carmine 6B), condensation azo pigments such as C.I. Pigment Red 144 (condensation azo red BR, etc.), acidic dye lake pigments such as C.I. Pigment Red 174 (phloxine B lake, etc.), basic dye lake pigments such as C.I. Pigment Red 81 (rhodamine 6G' lake, etc.), anthraquinone pigments such as C.I. Pigment Red 177 (dianthraquinonyl red, etc.), thioindigo pigments such as C.I. Pigment Red 88 (Thioindigo Bordeaux, etc.), perynone pigments such as C.I. Pigment Red 194 (perynone red, etc.), perylene pigments such as C.I. pigment red 149 (perylene scarlet, etc.), quinacridone pigments such as C.I. Pigment Violet 19 (unsubstituted quinacridone) and C.I. Pigment Red 122 (quinacridone magenta, etc.), isoindolinone pigments such as C.I. Pigment Red 180 (isoindolinone red 2BLT, etc.), alizarin lake pigments such as C.I. Pigment Red 83 (madder lake, etc.), and the like.

Examples thereof exhibiting blue or cyan color include disazo pigments such as C.I. Pigment Blue 25 (dianisidine blue, etc.), phthalocyanine pigments such as C.I. Pigment Blue 15 (phthalocyanine blue, etc.), acidic dye lake pigments such as C.I. Pigment Blue 24 (peacock blue lake, etc.), basic dye lake pigments such as C.I. Pigment Blue 1 (Victria Pure Blue BO lake, etc.), anthraquinone pigments such as C.I. Pigment Blue 60 (indanthron blue, etc.), alkali blue pigments such as C.I. Pigment Blue 18 (alkali Blue V-5:1), and the like.

Examples of the pigment exhibiting green color include phthalocyanine pigments such as C.I. Pigment Green 7 (phthalocyanine green) and C.I. Pigment Green 36 (phthalocyanine green), and azometal complex pigments such as C.I. Pigment Green 8 (nitroso green). Examples of the pigment exhibiting orange color include isoindoline-based pigments such as C.I. Pigment Orange 66 (isoindoline orange), and anthraquinone-based pigments such as C.I. Pigment Orange 51 (dichloropyranthrone orange).

Examples of the pigment exhibiting black color carbon black, titanium black, and aniline black. Specific examples of the white pigments include basic lead carbonate ($2PbCO_3Pb(OH)_2$, so-called silver white), zinc oxide ($ZnO$, so-called zinc white), titanium oxide ($TiO_2$, so-called titanium white), and strontium titanate ($SrTiO_3$, so-called titanium strontium white).

Titanium oxide has a lower density and a higher refractive index than other white pigments, is more stable chemically or physically, and thus, has a greater masking and coloring potentials as a pigment, and is excellent in resistance to acid or alkali and other environmental factors. Thus, use of titanium oxide as the white pigment is preferable. Other white pigments (including white pigments other than those described above) may be used as needed.

For dispersing the pigment, any one of dispersing machines, such as ball mill, sand mill, attriter, roll mill, jet mill, homogenizer, paint shaker, kneader, agitator, Henschel mixer, colloid mill, ultrasonic wave homogenizer, pearl mill, and wet jet mill, may be used. It is also possible to add a dispersant during dispersion of the pigment. Examples of the dispersants include hydroxyl group-containing carboxylic acid esters, salts of a long-chain polyaminoamide with a high-molecular weight acid ester, high-molecular weight polycarboxylic acid salts, high-molecular weight unsaturated acid esters, high-molecular weight copolymers, modified polyacrylates, polyvalent aliphatic carboxylic acids, naphthalenesulfonic acid/formalin condensates, polyoxyethylene alkylphosphoric esters, pigment derivatives, and the like. Use of a commercially available polymer dispersant such as a Solsperse series product manufactured by Zeneca is also preferable. A dispersion aid suitable for the pigment may be used as a dispersion aid. The dispersant and dispersion aid are preferably added in an amount of 1 to 50 parts by mass with respect to 100 parts by mass of the pigment.

A solvent may be added as the dispersion medium for various components such as pigment in the ink composition or alternatively, the cationic polymerizable compound above, which is a low-molecular weight component, may be used without solvent; but, the ink composition according to the invention preferably contains no solvent, because the composition is a radiation-curing ink that is hardened after application on a recording medium. It is because the solvent remaining in the hardened ink image leads to deterioration in solvent resistance and causes a problem of VOC (Volatile Organic Compound). From the viewpoints above, the cation polymerizable compound is preferably used as the dispersion medium, and selection of a cation polymerizable monomer lowest in viscosity among them is preferable for improvement in dispersibility and processability of the ink composition.

The average diameter of the pigment is preferably in the range of 0.02 to 0.4 µm, more preferably 0.02 to 0.1 µm, and still more preferably 0.02 to 0.07 µm. The pigment, the dispersant, and dispersion medium are selected and the dispersion and filtration conditions are determined in such a manner that the average diameter of the pigment particles falls in the preferable range above. Control of particle diameter enables prevention of the clogging in head nozzles and preservation of the storage stability, transparency and curing efficiency of ink.

<Dye>

The dye for use in the invention is preferably an oil soluble dye. Specifically, the dye preferably has a solubility in water (mass of the colorant dissolved in 100 g of water) of 1 g or less at 25° C., preferably 0.5 g or less, and more preferably 0.1 g or less. Accordingly, so-called water-insoluble and oil soluble dyes are used favorably.

As for the dyes for use in the invention, it is preferable to introduce an oil-solubilizing group on the basic dye structure described above, to ensure that the dye is dissolved in the amount needed in the ink composition. Examples of the oil-solubilizing groups include long-chain branched alkyl groups, long-chain branched alkoxy groups, long-chain branched alkylthio groups, long-chain branched alkylsulfonyl groups, long-chain branched acyloxy groups, long-chain branched alkoxycarbonyl groups, long-chain branched acyl groups, long-chain branched acylamino groups, branched alkylsulfonylamino groups, long-chain branched alkylaminosulfonyl groups, as well as aryl, aryloxy, aryloxycarbonyl, arylcarbonyloxy, arylaminocarbonyl, arylaminosulfonyl, and arylsulfonylamino groups containing these long-chain branched substituent groups, and the like. Alternatively, it is also possible to introduce an oil-solubilizing group, such as alkoxycarbonyl, aryloxycarbonyl, alkylaminosulfonyl or arylaminosulfonyl, on water-soluble dyes containing carboxylic acid or sulfonic acid groups, by using a long-chain branched alcohol, amine, phenol, or aniline derivative.

The melting point of the oil soluble dye is preferably 200° C. or lower, more preferably 150° C. or lower, and further preferably 100° C. or lower. Through the use of an oil soluble dye having a low melting point, crystallization of the dye in the ink composition is suppressed, which improves the storage stability of the ink composition. The dye preferably has an higher oxidation potential for achieving higher resistance to fading in particular caused by oxidizers such as ozone, and better curing properties. Accordingly, the oxidation potential of the oil soluble dye used in the invention is preferably 1.0 V (vs SCE) or higher, more preferably 1.1 V (vs SCE) or higher, and particularly preferably 1.15 V (vs SCE) or higher.

The yellow dyes having the structure represented by the formula (Y-I) described in JP-A 2004-250483 are preferable. Example of the dyes particularly preferable include the dyes represented by the formulae (Y-II) to (Y-IV) in JP-A No. 2004-250483, paragraph No. (0034), and typical examples thereof include the compounds described in JP-A No. 2004-250483, paragraph Nos. (0060) to (0071). The oil soluble dyes represented by the formula (Y-I) described therein may be used not only in yellow ink, but also in inks in any other colors such as black and red.

The compounds having the structures represented by the formulae (3) and (4) in JP-A No. 2002-114930 are preferable as the magenta dyes; and typical examples thereof include the compounds described in JP-A No. 2002-114930, paragraph Nos. (0054) to (0073). Particularly preferable dyes are the azo dyes represented by the formulae (M-1) to (M-2) in JP-A No. 2002-121414, paragraph Nos. (0084) to (0122), and typical examples thereof include the compounds described in JP-A No. 2002-121414, paragraph Nos. (0123) to (0132). The oil soluble dyes represented by the formulae (3), (4), and (M-1) to (M-2) may be used not only in magenta ink, but also in inks in any other colors such as black and red inks.

Examples of the cyan dyes include the dyes represented by the formulae (I) to (IV) described in JP-A No. 2001-181547, and the formulae (IV-1) to (IV-4) described in JP-A No. 2002-121414, paragraph Nos. (0063) to (0078), and specific examples thereof include the compounds described in JP-A No. 2001-181547, paragraph Nos. (0052) to (0066), and JP-A No. 2002-121414, paragraph Nos. (0079) to (0081). Examples of the particularly preferable dyes include the phthalocyanine dyes represented by the formulae (C-I) and (C-II) described in JP-A No. 2002-121414, paragraph Nos. (0133) to (0196), and the phthalocyanine dye represented by the formula (C-II) is even further preferable. Specific examples thereof include the compounds described in JP-A No. 2002-12141, paragraph Nos. (0198) to (0201). The oil soluble dyes represented by the formulae (I) to (IV), (IV-1) to (IV-4), (C-I), and (C-II) are applicable to any color other than cyan, such as black ink and green ink.

These coloring agents are preferably added to the ink composition in an amount of from 1 to 20% by mass, more preferably from 2% by mass to 10% by mass as solid matter.

(Other Components)

Various additives which may added as needed to the ink composition according to the invention are described below.

<Ultraviolet Absorbent>

An ultraviolet absorbent may be added to the ink composition according to the invention, for improvement in weather fastness and prevention of discoloration of the image obtained. Examples of the ultraviolet absorbents include the benzotriazole compounds described in JP-A Nos. 58-185677, 61-190537, 2-782, 5-197075 and 9-34057 and others; the benzophenone compounds described in JP-A Nos. 46-2784 and 5-194483, U.S. Pat. No. 3,214,463, and others; the cinnamic acid compounds described in JP-B Nos. 48-30492 and 56-21141, JP-A No. 10-88106, and others; the triazine compounds described in JP-A Nos. 4-298503, 8-53427, 8-239368, 10-182621, and 8-501291, and others; the compounds described in Research Disclosure No. 24239; compounds emitting light by absorbing ultraviolet ray such as stilbene and benzoxazole compounds; so-called fluorescent brighteners; and the like. The addition amount may be decided suitably according to applications, but is generally, approximately from 0.5% by mass to 15% by mass as solid matter.

<Sensitizer>

In the invention, a sensitizer may be added for the purposes of improving the efficiency of acid generation by the photo acid generating agent, and extending the photosensitive wavelength of the agent. The sensitizer may be any sensitizer which sensitizes the photo acid generating agent through an electron transfer mechanism or an energy transfer mechanism. Preferable examples thereof include fused polycyclic aromatic compounds such as anthracene, 9,10-dialkoxyanthracene, pyrene, and perylene, aromatic ketone compounds such as acetophenone, benzophenone, thioxanthone, and Michler ketone, and heterocyclic compounds such as phenothiazine and N-aryloxazolidinone. The addition amount is selected properly according to applications, but, and more preferably 0.1 to 0.5 mole % with respect to the photo acid generating agent.

<Antioxidant>

An antioxidant may be added according to the invention, for improvement of stability of the ink composition. Examples of the antioxidants include those described in EP Laid-Open Nos. 223739, 309401, 309402, 310551, 310552, and 459416, German Patent Laid-Open No. 3435443, JP-A Nos. 54-48535, 62-262047, 63-113536, 63-163351, 2-262654, 2-71262, 3-121449, 5-61166, and 5-119449, U.S. Pat. Nos. 4,814,262 and 4,980,275, and others. The addition amount is decided properly according to applications, but generally, approximately from 0.1% by mass to 8% by mass as solid matter.

<Antifading Agent>

Various types of organic antifading agents and metal complex antifading agents may be used according to the invention. Examples of the organic antifading agents include hydroquinones, alkoxy phenols, dialkoxy phenols, phenols, anilines, amines, indanes, chromanes, alkoxy anilines, and heterocycles. Examples of the metal complex antifading agents include nickel complexes and zinc complexes. Specific examples thereof include the compounds described in patents cited in Research Disclosure No. 17643, VII, Sections I to J, Research Disclosure No. 15162, Research Disclosure No. 18716, p. 650 left column, Research Disclosure No. 36544, p. 527, Research Disclosure No. 307105, p. 872, and Research Disclosure No. 15162, and the compounds included in the formula of typical compounds and compound examples described in JP-A No. 62-215272, pp. 127-137. The addition amount is selected properly according to applications, but preferably from 0.1% by mass to 8% by mass as solid matter.

<Conductive Salt>

A conductive salt such as potassium thiocyanate, lithium nitrate, ammonium thiocyanate, and dimethylamine hydrochloride may be added according to the invention, for the purpose of controlling the ejection properties.

<Solvent>

Addition of an extremely trace amount of organic solvent to the ink composition according to the invention is effective for improvement in adhesiveness to the recording medium. Examples of the solvents include ketone solvents such as acetone, methyl ethyl ketone, and diethyl ketone; alcohol solvents such as methanol, ethanol, 2-propanol, 1-propanol, 1-butanol, and tert-butanol; chlorine-based solvents such as chloroform, and methylene chloride; aromatic solvents such as benzene and toluene; ester solvents such as ethyl acetate, butyl acetate, and isopropyl acetate; ether solvents such as diethyl ether, tetrahydrofuran, and dioxane; glycol ether solvents such as ethylene glycol monomethyl ether and ethylene glycol dimethyl ether; and the like. In such a case, the amount of the solvent added is in the range that does not cause problems of solvent resistance and VOC, and thus, preferably in the range of from 0.1% by mass to 5% by mass, more preferably from 0.1% by mass to 3% by mass, in the entire ink composition.

<Polymer Compound>

Various types of polymer compounds may be added according to the invention for the purpose of controlling the physical properties of the film formed by curing.

Examples of the polymer compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinyl resins, acrylic resins, rubber resin, waxes, other natural resins, and the like. These resins may be used in combination of two or more. Among them, vinyl copolymers obtained by copolymerization with an acrylic monomeric are preferable. In addition, copolymers containing a "carboxyl group-containing monomer", an "alkyl methacrylate ester", or an "alkyl acrylate ester" as the structural unit as a copolymerization component are also used favorably for the polymer binding material.

<Surfactant>

Surfactants may be added in the ink composition of the invention. The surfactants include those described in JP-A Nos. 62-173463 and 62-183457. Examples thereof include anionic surfactants such as dialkylsulfosuccinic acid salts, alkylnaphthalenesulfonic acid salts, and fatty acid salts; nonionic surfactants such as polyoxyethylene alkyl ethers, polyoxyethylene alkyl allyl ethers, acetylene glycol, and polyoxyethylene-polyoxypropylene block copolymers; cationic surfactants such as alkylamine salts and quaternary ammonium salts; and the like. An organic fluorocompound may be used instead of the surfactant. The organic fluorocompound is preferably hydrophobic. Examples of the organic fluorocompounds include fluorochemical surfactants, oily fluorochemical compounds (e.g., fluorine oil) and solid fluorochemical compound resins (e.g., tetraethylenefluoride resin); and typical examples thereof include those described in JP-B No. 57-9053 (Columns 8 to 17) and JP-A No. 62-135826.

In addition, a leveling additive, a matting agent, a wax for adjustment of film physical properties, or a tackifier for improvement of the adhesiveness to the recording medium such as of polyolefin and PET that does not inhibit polymerization may be added as needed to the ink composition according to the invention. Typical examples of the tackifiers include the high-molecular weight adhesive polymers described in JP-A 2001-49200, pp. 5 to 6 (e.g., copolymers of a (meth) acrylic ester and an alcohol with an alkyl group having 1 to 20 carbons, of a (meth) acrylic ester and an alicyclic alcohol having 3 to 14 carbons, and of a (meth) acrylic ester and an aromatic alcohol having 6 to 14 carbons), and low-molecular weight adhesive resin containing a polymerizable unsaturated bond, and the like.

(Preferred Property of Ink Composition)

In cases where the ink composition according to the invention is used as an inkjet recording ink, in consideration of the ejection properties, the viscosity is preferably from 7 mPa·s to 30 mPa·s, and more preferably from 7 mPa·s to 20 mPa·s at the temperature during ejection (for example from 40° C. to 80° C., preferably from 25° C. to 30° C.). For example, the viscosity of the ink composition according to the invention at room temperature (from 25° C. to 30° C.) is preferably from 35 mPa·s to 500 mPa·s, and more preferably from 35 mPa·s to 200 mPa·s. The composition ratio of the ink composition according to the invention is preferably adjusted properly in such a manner that the viscosity falls within the above-described range. When the composition is highly viscous at room temperature, ink penetration into a recording medium is avoided even if the recording medium is porous, which allows to reduce the amount of uncured monomers and odors. Further, bleeding of the landed ink droplets is reduced, which results in the improvement of image quality.

The surface tension of the ink composition according to the invention is preferably from 20 mN/m to 30 mN/m, and more preferably from 23 mN/m to 28 mN/m. When the ink composition according to the invention is used on various recording media such as polyolefin, PET, coated paper, and non-coated paper, the surface tension thereof is preferably 20 mN/m or more for prevention of ink bleeding and penetration, and 30 mN/m or less for improvement in wettability therewith.

The ink composition according to the invention is favorably used as an inkjet recording ink. In cases where the composition is used as an inkjet recording ink, the ink composition is ejected on a recording medium using an inkjet printer, thereafter the ejected ink composition is cured by irradiation with a radiation for recording.

Since the image portion is cured by irradiation of the radiation such as ultraviolet rays, and the image portion has an excellent strength, the printed material obtained by the ink composition may be used for various usages such as formation of an ink receiving layer (image portion) of a planographic printing plate, in addition to image formation by the ink.

[Inkjet Recording Method and Printed Material]

The inkjet recording method to which the ink composition according to the invention is favorably applied (the inkjet recording method according to the invention) is further described below. The inkjet recording method according to the invention comprises: ejecting the ink composition according to the invention onto a recording medium (for example, a support or a recording material) using an inkjet recording apparatus, and then curing the ink composition by irradiating the ejected ink composition with active radiation. The cured ink composition forms an image on the recording medium.

The recording medium applicable to the inkjet recording method according to the invention is not particularly limited, and examples thereof include papers such as ordinary uncoated paper and coated paper, various unabsorbent resin materials and films thereof used for so-called soft packaging. Examples of the various plastic films include a PET film, an OPS film, an OPP film, an ONy film, a PVC film, a PE film, and a TAC film. Other examples of the plastics useful as the recording medium material include, polycarbonate, acrylic resins, ABS, polyacetal, PVA, and rubbers. Metals and glasses are also useful as the recording medium. The ink composition according to the invention undergoes less heat shrinkage during curing, and provides excellent adhesiveness to the base material (recording medium). Therefore, the ink composition has the advantage in its capability to form a high definition image even on a film tends to be curled or deformed by curing shrinkage of the ink, or by heat generated during curing reaction of the ink, for example, thermally shrinkable films, a PET film, an OPS film, an OPP film, an ONy film, and a PVC film. In addition, another examples of the recording material applicable to the invention include the support of the planographic printing plate.

Examples of the actinic radiation applicable to the inkjet recording method according to the invention include α rays, γ rays, X rays, ultraviolet ray, visible light, infrared light, and electron beams. The peak wavelength of the active radiation is preferably from 200 nm to 600 nm, more preferably from 300 nm to 450 nm, and further preferably from 350 nm to 420 nm. The power of the active radiation is preferably 2,000 mJ/cm$^2$ or less, more preferably from 10 mJ/cm$^2$ to 2,000 mJ/cm$^2$, further preferably from 20 mJ/cm$^2$ to 1,000 mJ/cm$^2$, and most preferably from 50 mJ/cm$^2$ to 800 mJ/cm$^2$. In particular, according to the inkjet recording method according to the invention, the radiation ray is preferably emitted from a light emitting diode which emits ultraviolet ray having a emission peak wavelength of from 350 nm to 420 nm and achieving a maximum illumination intensity of from 10 mW/cm$^2$ to 1,000 mW/cm$^2$ on the surface of the above-described recording medium. The ink composition of the invention may be curable in high sensitivity under less exposure amount of light such as light irradiated from a light emitting diode.

In the inkjet recording method according to the present invention, the above-described ink composition of the present invention is used and the ink composition is cured by irradiation with active radiation, and thus an image excellent in rubbing resistance and having controlled surface stickiness can be formed. It should be noted that, with respect to irradiation with active radiation, exposure for each color is preferable from the viewpoint of promoting curing, although exposure can be collectively carried out after ejecting all colors.

The printed material of the invention is a product containing an image formed from the ink composition of the invention by the inkjet recording method described above (namely, the inkjet recording method of the invention). It therefore is a printed material which has an image being excellent in rubbing resistance and having controlled surface stickiness.

The ink composition of the present invention is preferably used for image formation of a common printed material as described above, and can also be preferably used in an aspect of forming an image on a target recording media, such as a support, and then processing the same. Today, printed materials, such as decoration sheet having been formed, are used in various applications. For example, in membrane switch surface sheets used in electric appliances and the like, an image is formed on a thin plastic sheet (e.g. sheets of PET, polycarbonate, polystyrene, etc. about 100 μm in thickness) and then the sheet is subjected to embossing in the switch portion (clicking portion) for the purpose of imparting a click feeling. In many cases, a printed material is matte finished or a printed material after formation of an image is subjected to embossing for producing three-dimensional appearance in design.

Vending machine of drink products, such as drinking water, tea and juice, have spread widely, and dummy showpieces which show products to be sold are displayed in such vending machines. Such dummy showpieces are produced so that the product image may be advertised strongly, by preparing first a flat support by decoration printing on a transparent thermoplastic resin sheet, producing a highly standing article by deeply drawing the support into a half-cut shape of a full-size drink product container (in some occasion, as deep as 25 mm or more), and applying light from the back thereof.

As processing methods for producing such a deep-drawn article of a decorated thermoplastic resin sheet, vacuum forming, pressure forming or vacuum-pressure forming is most favorable. Vacuum forming is basically a technique including preheating a flat support to a temperature at which it may be thermally deformed, and then suck it onto a mold by vacuuming, thereby keeping it in contact firmly with the mold and cooling it while stretching it. Pressure forming is a technique including pressuring a support to a mold from the opposite side, thereby keeping it in contact firmly with the mold and cooling it. In vacuum-pressure forming, the vacuuming and the pressuring are carried out simultaneously.

As properties of inks to be used for printed materials to be subjected to such processing, resistance of a formed image (printed material) to cracking, peeling, and the like and excellent impact resistance, flexibility and substrate adhesiveness of a cured film are required. On the other hand, the ink composition of the invention is strong against impact because its surface may be cured efficiently due to inclusion of a specific compound. In addition, in the ink composition of the invention, it is possible to secure curability of the surface (a non-stickiness film with high viscoelasticity) even when a bulk is fabricated into a soft film (a soft film with low viscoelasticity). Therefore, it may demonstrate a particularly favorable effect in applications where the aforementioned processing is applied after image formation. Among the above-mentioned applications of the ink composition of the invention, vacuum forming is particularly preferred.

EXAMPLES

The present invention will be described below more concretely with reference to Examples and Comparative Examples. However, the invention is not limited to these examples.

Example 1

Image Formation by Light Emitting Diode (LED)

| <<Preparation of ink>> | |
|---|---|
| Phenoxy ethyl acrylate | 36 parts by mass |
| Actilane 421 (acrylate monomer, manufactured by Akcros) | 16.0 parts by mass |
| n-vinylcaprolactam | 18 parts by mass |
| Solsperse 32000 (dispersant, manufactured by Noveon) | 0.4 part by mass |
| Cinquasia Mazenta RT-355D (pigment, manufactured by Ciba Specialty Chemicals) | 3.6 parts by mass |
| Genorad 16 (stabilizer, manufactured by Rahn) | 0.05 part by mass |
| Rapi-Cure DVE-3 (vinyl ether, manufactured by ISP Europe) | 8.0 parts by mass |
| Lucirin TPO (photopolymerization initiator, manufactured by BASF A.G.) | 8.5 parts by mass |
| Benzophenone (photopolymerization initiator) | 4.0 parts by mass |
| Irgacure 184 (photopolymerization initiator, manufactured by Ciba Specialty Chemicals) | 4.0 parts by mass |
| Byk 307 (defoaming agent, manufactured by BYK Chemie) | 0.05 part by mass |
| Specific polymer A-1 (compound mentioned above) | 0.9 part by mass |

The prepared ink composition was filtered through a filter with an absolute filtration accuracy of 2 μm.

<<Inkjet Image Recording>>

Next, using the ink composition obtained above, recording on a recording medium was performed with a commercially available inkjet recording apparatus having a piezoelectric inkjet nozzle. The ink supply system was composed of a main tank, a supply pipe, an ink supply tank immediately before an inkjet head, a filter, and a piezoelectric inkjet head, and the section from the ink supply tank to the inkjet head was thermally insulated and heated. Temperature sensors were provided on the ink supply tank and in the vicinity of the nozzle of the inkjet head, and the temperature was controlled so that the nozzle section was always at 70° C.±2° C. The piezoelectric inkjet head was driven so as to discharge multisize dots of from 8 pl to 30 pl at a resolution of 720×720 dpi. The term dpi referred to in the invention represents the number of dots per inch (~2.54 cm).

The ink prepared above was discharged at an environmental temperature of 25° C., and irradiated with UV rays using a UV-light emitting diode (UV-LED). The exposure was conducted under an energy level that could completely cure the inks to the point where tackiness to the touch disappeared. As recording media, a grained aluminum support, a transparent biaxially orientated polypropylene film whose surface had been treated so as to be printable, a PVC sheet (trade name: MPI 1005, 2 mm PVC vinyl, manufactured by Avery), a cast coated paper, and a commercially available recycled paper were used. Color Images were recorded on these recording media, and images having a high resolution with no dot bleeding were obtained in all cases. Further, for high quality paper, the ink did not penetrate to the reverse side, the ink was sufficiently cured, and there was hardly any odor due to unreacted monomer. Moreover, the images recorded on the film had sufficient flexibility, did not crack when bent, and there were no problems therewith in an adhesion test involving peeling with Sellotape (registered trademark).

The UV-LED used was an NCCU033 manufactured by Nichia Corporation. The LED emitted an UV ray having a wavelength of 365 nm from the tip, and a ray at an intensity of 100 mW per tip was emitted when a current of 500 mA was applied. Arranging multiple chips at intervals of 7 mm gave a power of 0.3 W/cm$^2$ on the surface of the recording medium, which was hereinafter referred to also as medium. The period from ink deposition to exposure and the duration of exposure might be changed by changing the conveyance speed of a medium and/or the distance between the head and the LED in the medium-conveyance direction. In this Example, the droplet was exposed to light 0.5 second after ink deposition. By adequate selection of the distance between the medium and the LED and of the conveyance speed setting, the exposure energy on the medium might be adjusted in the range of from 0.01 J/cm$^2$ to 15 J/cm$^2$.

Examples 2 to 10

Ink compositions of Examples 2 to 10 were obtained in a manner substantially similar to as in Example 1, except using compounds listed in Table 1 in place of the specific polymer in Example 1.

Comparative Example 1

An ink composition of Comparative Example 1 was obtained in a manner substantially similar to as in Example 1, except not containing the specific polymer in Example 1.

Comparative Example 2

An ink composition of Comparative Example 2 was obtained in a manner substantially similar to as in Example 1, except using a comparative compound 1 shown below not containing a fluorine site in place of the specific polymer in Example 1.

Comparative comound 1

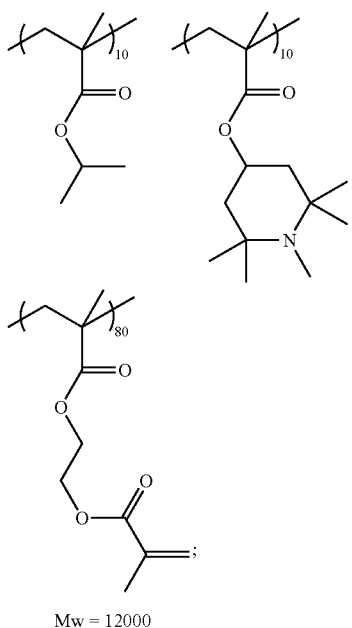

Mw = 12000

The ink compositions obtained in Examples 1 to 10 and Comparative Examples 1 and 2 were evaluated by the following method for curing sensitivity, blocking properties, and rubbing resistance. The results are shown in Table 1.

<<Evaluation of Inkjet Image>>

The image formed on a soft polyvinyl chloride sheet using the above-mentioned ink was evaluated according to the method described below.

(Measurement of Curing Sensitivity)

The amount of exposure energy (mJ/cm$^2$) that was necessary to eliminate the adhesiveness on the image surface after UV irradiation was defined as curing sensitivity. A smaller value indicated a higher sensitivity.

(Evaluation of Blocking Property)

Onto an image after ultraviolet ray irradiation, 500 sheets of PET (size: the same both in length and in width as that of the soft vinyl chloride sheet on which the image has been formed; weight: 2 g/sheet) were superposed and left at rest for 1 day. Then, transfer to PET was visually observed. When no transfer was recognized, it was evaluated as being A. When some transfer was recognized, it was evaluated as being C.

(Evaluation of Rubbing Resistance)

A soft vinyl chloride sheet was rubbed with an eraser (K-50 PLASTIC ERASER KEEP, manufactured by Hoshiya), and the transfer to the eraser was evaluated. When no transfer was recognized, it was evaluated as being A. When some transfer was recognized, it was evaluated as being C.

TABLE 1

|  | Specific polymer | Curing sensitivity | Blocking properties | Rubbing resistance |
|---|---|---|---|---|
| Ex. 1 | A-1 | 300 | A | A |
| Ex. 2 | A-2 | 300 | A | A |
| Ex. 3 | A-6 | 300 | A | A |
| Ex. 4 | A-9 | 300 | A | A |
| Ex. 5 | A-10 | 300 | A | A |
| Ex. 6 | A-11 | 310 | A | A |
| Ex. 7 | A-13 | 300 | A | A |
| Ex. 8 | A-19 | 300 | A | A |
| Ex. 9 | A-23 | 300 | A | A |
| Ex. 10 | A-26 | 330 | A | A |
| Comp. Ex. 1 | None | 2,300 | C | C |
| Comp. Ex. 2 | Comparative compound 1 | 400 | C | C |

Table 1 shows that each ink composition containing the specific polymer of the present invention is cured with high sensitivity and is excellent in blocking properties and rubbing resistance.

In contrast, it is revealed that Comparative Example 1 not containing the specific polymer has very poor sensitivity and that the ink composition of Comparative Example 2 using the comparative compound 1 containing no fluorine site is poor in terms of sensitivity, blocking properties, and rubbing resistance.

The present invention can provide an ink composition capable of forming an image which has favorable curing sensitivity, is excellent in rubbing resistance and blocking properties, and has controlled surface stickiness and improved surface curing properties, an inkjet recording method using the ink composition, and a printed material.

Namely, the present invention may provide the following items <1> to <17>.

<1>. An ink composition comprising a polymer (a) including: a partial structure selected from the group consisting of a fluorine-substituted hydrocarbon group, a siloxane skeleton, and a long-chain alkyl group; a radical polymerizable group; and a tertiary amine structure.

<2>. The ink composition according to the item <1>, wherein the fluorine-substituted hydrocarbon group is introduced using a monomer represented by Formula II:

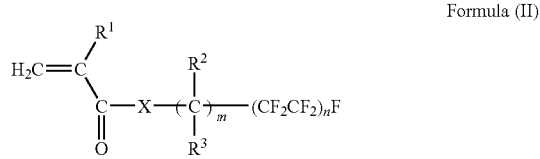

Formula (II)

wherein in Formula (II), $R^1$ represents a hydrogen atom, a halogen atom, a methyl group which may have a substituent group, or an ethyl group which may have a substituent group; $R^2$ and $R^3$ each independently represent a hydrogen atom or an alkyl group having 1 to 4 carbon atoms; X represents a covalent bond or a divalent connecting group (organic group); m represents an integer of 0 or more; and n represents an integer of 1 or more.

<3>. The ink composition according to the items <1> or <2>, wherein the siloxane skeleton is polysiloxane in which a compound represented by Formula (A) has been polymerized;

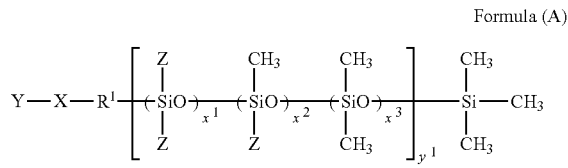

Formula (A)

wherein in Formula (A), $R^1$ represents a straight or branched alkylene group having 2 to 6 carbon atoms or a divalent connecting group represented by Formula (B); $x^1$, $x^2$, and $x^3$ each represent an integer in which the total of $x^1$, $x^2$, and $x^3$ is from 1 to 100; $y^1$ represents an integer of from 1 to 10; X represents a single bond or a divalent group represented by Formula (C); Y represents a monovalent group represented by Formulae (D) to (F); and Z represents a monovalent group represented by the following structure;

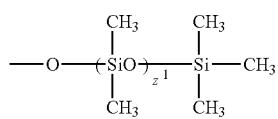

wherein in the above structure, $z^1$ represents an integer of from 3 to 100;

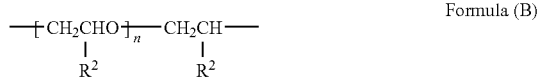

Formula (B)

wherein in Formula (B), $R^2$ represents a hydrogen atom or a methyl group and n represents an integer of from 1 to 50;

$$-Z^1-CO-NH-R^3-NH-CO-$$ Formula (C)

wherein in Formula (C), $Z^1$ represents an oxygen atom, a sulfur atom, or $NR^4$; $R^4$ represents a hydrogen atom or an alkyl group having 1 to 4 carbon atoms; is bonded to $R^1$ in Formula (A); and $R^3$ represents a divalent aliphatic or alicyclic group having 6 to 10 carbon atoms;

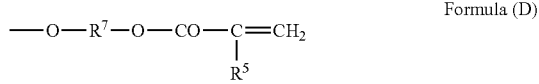

Formula (D)

Formula (E)

Formula (F)

wherein in Formulae (D) to (F), $R^5$ represents a hydrogen atom or a straight chain or branched chain alkyl group having 1 to 6 carbon atoms, $R^6$ represents a straight chain or branched chain alkylene group having 2 to 10 carbon atoms, and $R^7$ represents a straight chain or branched chain alkylene group having 1 to 6 carbon atoms.

<4>. The ink composition according to any one of the items <1> to <3>, wherein the long-chain alkyl group is a substituent group represented by $-C_nH_{2n+1}$ in Formula (1), and is introduced into a polymer in the form represented by Formula (1):

Formula (1)

wherein in Formula (1), n represents an integer of from 6 to 40, and Y represents a trivalent connecting group.

<5>. The ink composition according to any one of the items <1> to <4>, wherein the tertiary amine structure is the following structure,

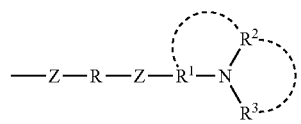

wherein in the above structure, R and $R^1$ represent a straight chain, branched, or cyclic alkylene group having 1 to 6 carbon atoms; Z represents an oxygen atom, $-C(=O)O-$, $-OC(=O)NH-$, or $-NHC(=O)NH-$; $R^2$ and $R^3$ represent a straight chain, branched, or cyclic alkyl group having 1 to 6 carbon atoms; $R^1$ and $R^2$, or $R^2$ and $R^3$ may be mutually bonded to each other to form a ring having 5 to 7 carbon atoms; and the ring may have a substituent group.

<6>. The ink composition according to any one of the items <1> to <5>, further comprising a radical polymerizable compound (b) and a photoinitiator (c).

<7>. The ink composition according to the item <6>, wherein a content of the radical polymerizable compound (b) is from 60% by mass to 90% by mass based on the total solid content of the ink composition.

<8>. The ink composition according to any one of the items <1> to <7>, wherein the ink composition is used for an inkjet recording.

<9>. An inkjet recording method comprising:
    ejecting on a recordable medium the ink composition of any one of the items <1> to <8> using an inkjet recording apparatus; and
    curing the ink composition by irradiation of an actinic radiation ray to the ejected ink composition.

<10>. A printed material which is recorded by the inkjet recording method of the item <9>.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An ink composition comprising a polymer (a) having a radical polymerizable group, a tertiary amine structure, and a partial structure selected from the group consisting of a fluorine-substituted hydrocarbon group, a siloxane skeleton, and a $C_6$-$C_{40}$ alkyl group.

2. The ink composition according to claim 1, wherein the fluorine-substituted hydrocarbon group is incorporated into the polymer using at least one monomer represented by Formula II:

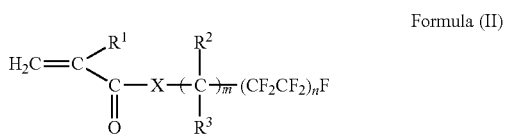

Formula (II)

wherein in Formula (II), $R^1$ represents a hydrogen atom, a halogen atom, a methyl group which may have a substituent group, or an ethyl group which may have a substituent group; $R^2$ and $R^3$ each independently represent a hydrogen atom or an alkyl group having 1 to 4 carbon atoms; X represents a covalent bond or a divalent connecting group (organic group); m represents an integer of 0 or more; and n represents an integer of 1 or more.

3. The ink composition according to claim 1, wherein the siloxane skeleton is at least one polysiloxane in which a compound represented by Formula (A) has been polymerized;

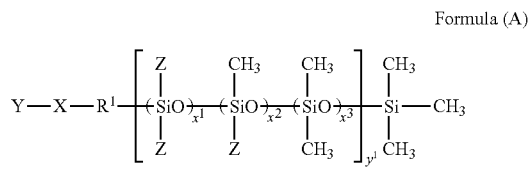

Formula (A)

wherein in Formula (A), $R^1$ represents a straight or branched alkylene group having 2 to 6 carbon atoms or a divalent connecting group represented by Formula (B); $x^1$, $x^2$, and $x^3$ each represent an integer in which the total of $x^1$, $x^2$, and $x^3$ is from 1 to 100; $y^1$ represents an integer of from 1 to 10; X represents a single bond or a divalent group represented by Formula (C); Y is a group selected from those represented by Formulae (D) to (F); and Z represents a monovalent group represented by the following structure;

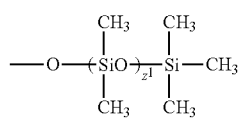

wherein in the above structure, $z^1$ represents an integer of from 3 to 100;

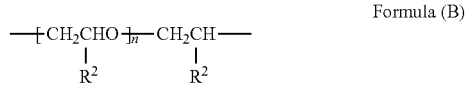

Formula (B)

wherein in Formula (B), $R^2$ represents a hydrogen atom or a methyl group, and n represents an integer of from 1 to 50;

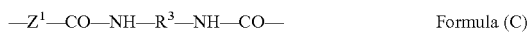

Formula (C)

wherein in Formula (C), $Z^1$ represents an oxygen atom, a sulfur atom, or $NR^4$; $R^4$ represents a hydrogen atom or an alkyl group having 1 to 4 carbon atoms; $Z^1$ is bonded to $R^1$ in Formula (A); and $R^3$ represents a divalent aliphatic or alicyclic group having 6 to 10 carbon atoms;

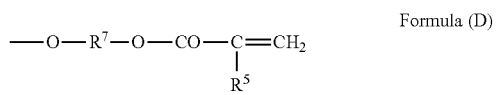

Formula (D)

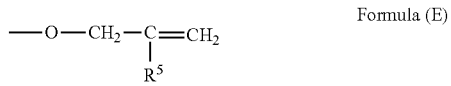

Formula (E)

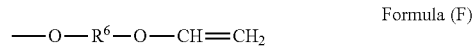

Formula (F)

wherein in Formulae (D) to (F), $R^5$ represents a hydrogen atom or a straight chain or branched chain alkyl group having 1 to 6 carbon atoms, $R^6$ represents a straight chain or branched chain alkylene group having 2 to 10 carbon atoms, and $R^7$ represents a straight chain or branched chain alkylene group having 1 to 6 carbon atoms.

4. The ink composition according to claim 1, wherein the $C_6$-$C_{40}$ alkyl group is at least one group represented by —$C_nH_{2n+1}$.

5. The ink composition according to claim 1, wherein the tertiary amine structure is the following structure,

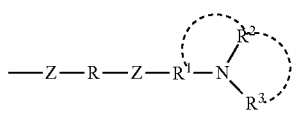

wherein in the above structure, R and $R^1$ represent a straight chain, branched, or cyclic alkylene group having 1 to 6 carbon atoms; Z represents an oxygen atom, —C (=O) O—, —OC (=O) NH—, or —NHC (=O) NH—; $R^2$ and $R^3$ represent a straight chain, branched, or cyclic alkyl group having 1 to 6 carbon atoms; $R^1$ and $R^2$, or $R^2$ and $R^3$ may be mutually bonded to each other to form a ring having 5 to 7 carbon atoms; and the ring may have a substituent group.

6. The ink composition according to claim 1, further comprising a radical polymerizable compound (b) and a photoinitiator (c).

7. The ink composition according to claim 6, wherein a content of the radical polymerizable compound (b) is from 60% by mass to 90% by mass based on the total solid content of the ink composition.

8. An inkjet recording method comprising:
ejecting on a recordable medium the ink composition of claim 1 using an inkjet recording apparatus; and
curing the ink composition by irradiation of an actinic radiation ray to the ejected ink composition.

9. A printed material which is recorded by the inkjet recording method of claim 8.

\* \* \* \* \*